(12) United States Patent
Zhang et al.

(10) Patent No.: US 12,531,661 B2
(45) Date of Patent: Jan. 20, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN); Yi Ding, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 343 days.

(21) Appl. No.: 18/221,780

(22) Filed: Jul. 13, 2023

(65) Prior Publication Data
US 2023/0361927 A1    Nov. 9, 2023

Related U.S. Application Data

(63) Continuation of application No. PCT/CN2021/071904, filed on Jan. 14, 2021.

(51) Int. Cl.
*H04L 1/1812*    (2023.01)
*H04L 5/00*    (2006.01)
*H04W 72/21*    (2023.01)

(52) U.S. Cl.
CPC .......... *H04L 1/1812* (2013.01); *H04L 5/0053* (2013.01); *H04W 72/21* (2023.01)

(58) Field of Classification Search
CPC ... H04L 1/1812; H04L 5/0053; H04L 1/1896; H04L 5/0055; H04L 1/1861; H04L 2001/0093; H04W 72/21; H04W 4/06
See application file for complete search history.

(56) References Cited

U.S. PATENT DOCUMENTS

2017/0353273 A1* 12/2017 Zhang .................. H04L 1/1671
2019/0190662 A1    6/2019 Lee et al.
(Continued)

FOREIGN PATENT DOCUMENTS

CN    107251588 A    10/2017
CN    111034340 A    4/2020
(Continued)

OTHER PUBLICATIONS

Telephone Consultation in the European application No. 21918458.7, mailed on Jul. 30, 2024, 1 page.
(Continued)

*Primary Examiner* — Edan Orgad
*Assistant Examiner* — Samuel Roberge Bettendorf
(74) *Attorney, Agent, or Firm* — BAYES PLLC

(57) ABSTRACT

Provided in the embodiments of the present disclosure are a wireless communication method, a terminal device and a network device. The method includes: a terminal device determining Hybrid Automatic Repeat Request (HARQ) feedback information corresponding to a first Group Radio Network Temporary Identifier (G-RNTI), wherein the first G-RNTI is associated with one or multiple Physical Uplink Control Channel (PUCCH) resources configured for a first feedback mode, and the first feedback mode includes an HARQ feedback mode only feeding back Non-Acknowledgement (NACK)-included HARQ feedback information; and the terminal device sending, on one of the one or multiple PUCCH resources, NACK-included HARQ feedback information corresponding to the first G-RNTI. By the solution provided in the present disclosure, feedback can be provided for multicast or broadcast, such that a network may determine, according to the feedback, whether data retransmission is needed, thereby ensuring the reliability of service transmission.

14 Claims, 6 Drawing Sheets

(56) References Cited

U.S. PATENT DOCUMENTS

| | | | |
|---|---|---|---|
| 2020/0106566 A1* | 4/2020 | Yeo | H04L 1/1812 |
| 2020/0351129 A1 | 11/2020 | Kwak | |
| 2022/0141849 A1* | 5/2022 | Lee | H04W 72/566 |
| | | | 370/329 |
| 2022/0183032 A1 | 6/2022 | Papasakellariou | |
| 2022/0337456 A1 | 10/2022 | Kwak | |
| 2022/0360950 A1* | 11/2022 | Li | H04L 5/0051 |

FOREIGN PATENT DOCUMENTS

| | | |
|---|---|---|
| CN | 111601274 A | 8/2020 |
| CN | 111884766 A | 11/2020 |
| EP | 4238259 A1 | 9/2023 |

OTHER PUBLICATIONS

CATT: "Discussion on reliability improvement mechanism for RRC_CONNECTED UEs in MBS", 3GPP Draft; R1-2007836, 3rd Generation Partnership Project (3GPP), Mobile Competence Centre; 650, Route Des Lucioles; F-06921 Sophia-Antipolis Cedex; L France, vol. RAN WG1, No. e-Meeting; Oct. 26, 2020-Nov. 13, 2020, Nov. 1, 2020 (Nov. 1, 2020), XP052349197, figure 3, sections 1-2. 8 pages.

Supplementary European Search Report in the European application No. 21918458.7, mailed on Dec. 4, 2023. 11 pages.

International Search Report in the international application No. PCT/CN2021/071904, mailed on Oct. 14, 2021. 5 pages with English translation.

English translation of the Written Opinion of the International Search Authority in the international application No. PCT/CN2021/071904, mailed on Oct. 14, 2021. 6 pages with English translation.

"3rd Generation Partnership Project; Technical Specification Group Radio Access Network; NR; Physical channels and modulation (Release 16)", 3GPP TS 38.211 V16.3.0 (Sep. 2020). 128 pages.

"3rd Generation Partnership Project; Technical Specification Group Radio Access Network; NR; Physical layer procedures for control (Release 16)", 3GPP TS 38.213 V16.3.0 (Sep. 2020). 179 pages.

"3rd Generation Partnership Project; Technical Specification Group Radio Access Network; NR; Radio Resource Control (RRC) protocol specification (Release 16)", 3GPP TS 38.331 V16.2.0 (Sep. 2020). 916 pages.

"RAN1 Chairman's Notes", 3GPP TSG RAN WG1 Meeting #103-e Inbox Chairman's Notes RAN1#103-e final, e-Meeting, Oct. 26-Nov. 13, 2020. 230 pages.

* cited by examiner

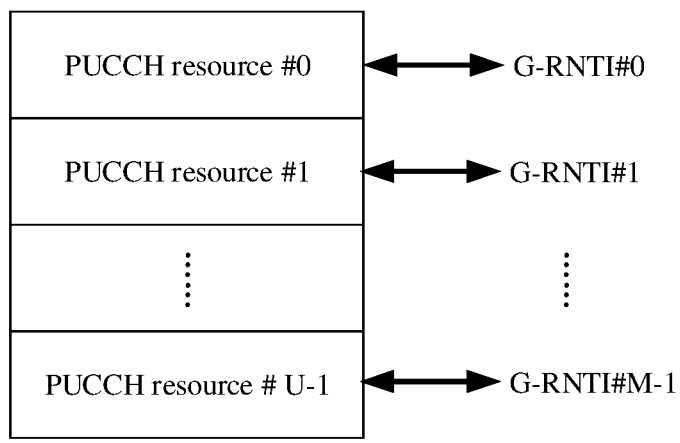
FIG. 9
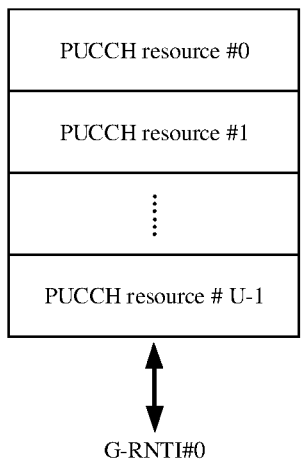 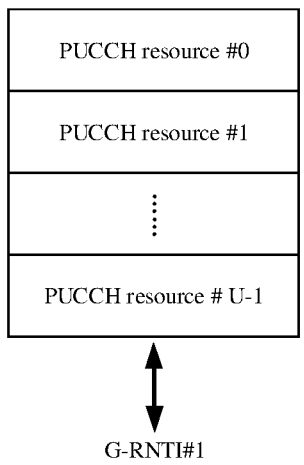 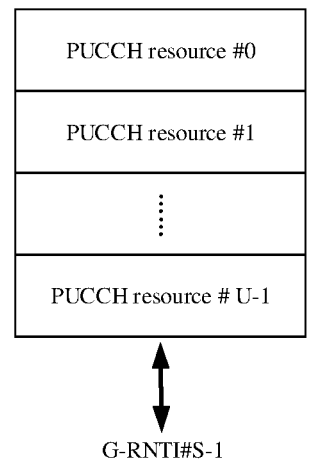
FIG. 10
300
A network device receives, on one or multiple PUCCH resources configured for a first feedback mode and associated with a first G-RNTI, NACK-included HARQ feedback information corresponding to the first G-RNTI, the first feedback mode including an HARQ feedback mode only feeding back NACK-included HARQ feedback information — S310
FIG. 11

WIRELESS COMMUNICATION METHOD, TERMINAL DEVICE AND NETWORK DEVICE

CROSS-REFERENCE TO RELATED APPLICATION

This application is a continuation of International Patent Application No. PCT/CN2021/071904 filed on Jan. 14, 2021, the content of which is all incorporated herein by reference in its entirety.

TECHNICAL FIELD

Embodiments of the present disclosure relate to the field of communications, and more specifically, to a wireless communication method, a terminal device and a network device.

BACKGROUND

In New Radio (NR), a unicast service in a Radio Resource Control (RRC) connected state may be fed back by using Hybrid Automatic Repeat Request (HARQ) feedback information. A feedback mechanism is not introduced in multicast or broadcast services in other systems. That is to say, a feedback is not required when a terminal device receives multicast or broadcast services.

However, for some services in the NR, for example, services in scenarios such as Vehicle to Everything (V2X) or industrial Internet, although a terminal device achieves transmission in a multicast manner, these services require increasingly high reliability. How to provide a feedback for multicast or broadcast is to be considered.

SUMMARY

A first aspect provides a wireless communication method, which includes the following operations.

A terminal device determines Hybrid Automatic Repeat Request (HARQ) feedback information corresponding to a first Group Radio Network Temporary Identifier (G-RNTI). The first G-RNTI is associated with one or multiple Physical Uplink Control Channel (PUCCH) resources configured for a first feedback mode, and the first feedback mode includes an HARQ feedback mode only feeding back Non-Acknowledgement (NACK)-included HARQ feedback information.

The terminal device sends, on one of the one or multiple PUCCH resources, the NACK-included HARQ feedback information corresponding to the first G-RNTI.

A second aspect provides a wireless communication method, which includes the following operations.

A network device receives Non-Acknowledgement (NACK)-included Hybrid Automatic Repeat Request (HARQ) feedback information corresponding to a first Group Radio Network Temporary Identifier (G-RNTI) on one or multiple Physical Uplink Control Channel (PUCCH) resources configured for a first feedback mode and associated with the first G-RNTI, wherein the first feedback mode comprises an HARQ feedback mode only feeding back NACK-included HARQ feedback information.

A third aspect provides a terminal device, configured to implement the method in the first aspect or each implementation thereof. Specifically, the terminal device includes functional modules configured to implement the method in the first aspect or each implementation thereof.

A fourth aspect provides a network device, configured to implement the method in the second aspect or each implementation thereof. Specifically, the network device includes functional modules configured to implement the method in the second aspect or each implementation thereof.

A fifth aspect provides a terminal device, including a processor and a memory. The memory is configured to store a computer program. The processor is configured to call and run the computer program stored in the memory, so as to implement the method in the first aspect or each implementation thereof.

A sixth aspect provides a network device, including a processor and a memory. The memory is configured to store a computer program. The processor is configured to call and run the computer program stored in the memory, so as to implement the method in the second aspect or each implementation thereof.

A seventh aspect provides a chip, configured to implement the method in any one of the first aspect to the second aspect or each implementation thereof. Specifically, the chip includes: a processor, configured to call and run a computer program from a memory, to enable a device having the chip mounted to implement the method in any one of the first aspect to the second aspect or each implementation thereof.

An eighth aspect provides a computer-readable storage medium having stored a computer program. The computer program enables a computer to execute the method in any one of the first aspect to the second aspect or each implementation thereof.

A ninth aspect provides a computer program product, including a computer program instruction. The computer program instruction enables a computer to execute the method in any one of the first aspect to the second aspect or each implementation thereof.

A tenth aspect provides a computer program. When the computer program is running on a computer, the computer executes the method in any one of the first aspect to the second aspect or each implementation thereof.

BRIEF DESCRIPTION OF THE DRAWINGS

FIG. 9 is a schematic diagram of an association relationship between a PUCCH resource and a G-RNTI according to an embodiment of the present disclosure.

FIG. 10 is a schematic diagram of an association relationship between a PUCCH resource set and a G-RNTI according to an embodiment of the present disclosure.

FIG. 11 is another schematic flowchart of a wireless communication method according to an embodiment of the present disclosure.

DETAILED DESCRIPTION

The technical solutions in the embodiments of the present disclosure will be described below with reference to the drawings in the embodiments of the present disclosure. It is apparent that the described embodiments are only part of the embodiments of the present disclosure, not all the embodiments. All other embodiments obtained by those of ordinary skill in the art based on the embodiments in the present disclosure without creative work all fall within the scope of protection of the present disclosure.

Figure 1:
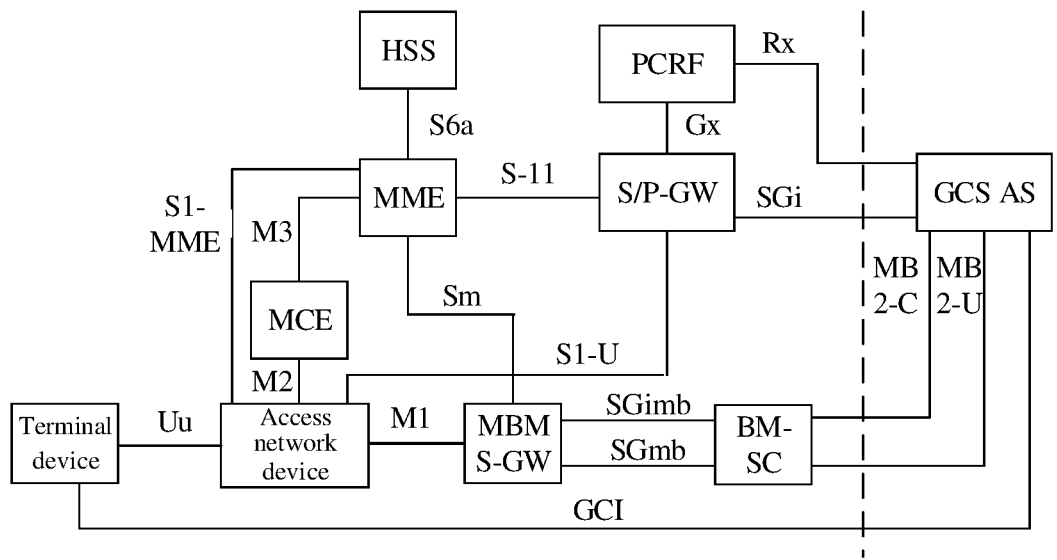
FIG. 1 is an example of a system architecture according to the present disclosure.

FIG. 1 is a schematic diagram of a system architecture according to an embodiment of the present disclosure.

As illustrated in FIG. 1, a system architecture 100 may include a terminal device, an access network device, a Multi-cell/multicast Coordination Entity (MCE), a Mobility Management Entity (MME), a Home Subscriber Server (HSS), a Policy and Charging Rules Function (PCRF), a Serving/PDN Gateway (S/P-GW), a Group Communication Service Application Server (GCS AS), a Broadcasting Multicast Service Center (BM-SC), a Multimedia Broadcast Multicast Service Gateway (MBMS-GW).

Each node or network element in the system architecture 100 may communicate with each other. For example, each node or network element in SC-PTM100 may communicate with each other through various types of interfaces.

For example, a terminal device may communicate with an access network device through a Uu interface; the access network device may communicate with an MCE through an M2 interface, may communicate with an MME through an S1-MME interface, may communicate with an MBMS-GW through an M1 interface, and may communicate with an S/P-GW through an S1-U interface; the MCE may communicate with the MME through an M3 interface; the MME may communicate with an HSS through an S6a interface, may communicate with the S/P-GW through an S-11, and may communicate with the MBMS-GW through an Sm interface; the S/P-GW may communicate with a GCS AS through an SGi interface, and may communicate with a PCRF through a Gx interface; the PCRF may communicate with the GCS AS through an Rx interface; the GCS AS may communicate with a BM-SC through an MB2-C interface and an MB2-U interface; and the BM-SC may communicate with the MBMS-GW through an SGimb interface.

It should be understood that, the interfaces involved above may be interfaces which are specified or defined in a communication standard, so as to achieve the transmission of data or signaling between each node or network element.

It is to be noted that, a specific implementation form of each node or network element is not limited in the present disclosure.

For example, the access network device may be an Evolutional Node B (eNB or eNodeB) in a Long Term Evolution (LTE) system, or a Next Generation Radio Access Network (NG RAN) device, or a base station (gNB) in an NR system, or a wireless controller in a Cloud Radio Access Network (CRAN). Alternatively, the network device 120 may be a relay station, an access point, a vehicle device, a wearable device, a hub, a switch, a network bridge, a router, a network device in a future evolved Public Land Mobile Network (PLMN), or the like.

For another example, the terminal device may be any terminal device, which includes, but is not limited to, a terminal device that is in wired or wireless connection with a network device 120 or other terminal device. For example, the terminal device may be an access terminal, UE, a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device of a wireless modem, a vehicle device, a wearable device, a terminal device in a 5G network, or a terminal device in a future evolved network. For another example, the terminal device may be used for the communication of Device to Device (D2D).

As an example, the system architecture 100 may be Single Cell Point To Multiploint (SC-PTM). The SC-PTM may be based on a Multimedia Broadcast Multicast Service (MBMS) network architecture.

An MBMS is a service which is introduced in 3GPP Release 6. The MBMS is a technology for transmitting data from a data source to a plurality of users through shared network resources, such that network resources can be effectively used while a multimedia service is provided, thereby realizing the broadcasting and multicasting of the multimedia service at higher speeds (256 kbps).

Since MBMS spectrum effectiveness in the 3GPP R6 is relatively low, it is not enough to effectively carry and support the operation of mobile-TV-type services. Therefore, in a Long Term Evolution (LTE) project, 3GPP proposes to enhance the support capability for a downlink high-speed multimedia broadcast multicast service, and defines design requirements for a physical layer and an air interface.

An E-MBMS is introduced into an LTE network by R9. The E-MBMS proposes the concept of Single Frequency Network (SFN), that is, data is simultaneously sent in all cells with a unified frequency, but the synchronization among the cells needs to be guaranteed. Such a manner may greatly enhance the overall signal-to-noise ratio distribution of the cells, and the spectrum effectiveness is also greatly enhanced accordingly. The broadcasting and multicasting of services are realized on the basis of an Internet Protocol (IP) multicast protocol.

In R13, SC-PTM is introduced. The SC-PTM is based on an MBMS network architecture. Optionally, the MCE determines whether to use an SC-PTM transmission mode or a Multimedia Broadcast multicast service Single Frequency Network (MBSFN) transmission mode.

Figure 2:
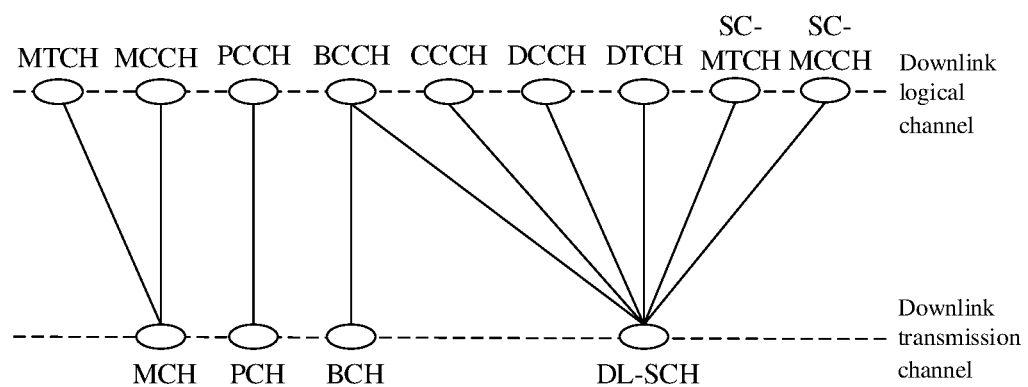
FIG. 2 is a schematic diagram of a mapping relationship between a logical channel and a transmission channel according to an embodiment of the present disclosure.

FIG. 2 is a schematic diagram of a logical channel and a physical channel of an SC-PTM according to an embodiment of the present disclosure.

As illustrated in FIG. 2, a downlink logical channel may include a Single Cell Multicast Control Channel (SC-MCCH) and a Single Cell Multicast Traffic Channel (SC-MTCH). For example, a Logical Channel Identifier (LCID) of the SC-MCCH is 11001, and an LCID of the SC-MTCH is 11001, such that the SC-MCCH and the SC-MTCH may be mapped onto a Downlink Shared Channel (DL-SCH), for example, a Physical Downlink Shared Channel (PDSCH). Optionally, the SC-MCCH and the SC-MTCH do not support an HARQ operation.

In addition, as illustrated in FIG. 2, the downlink logical channel may further include at least one of a Multicast Control Channel (MCCH), a Multicast Traffic Channel (MTCH), a Paging Control Channel (PCCH), a Common Control Channel (CCCH), a Dedicated Control Channel (DCCH), a Broadcast Control Channel (BCCH) and a Dedicated Traffic Channel (DTCH). In addition, a downlink transmission channel may further include at least one of a Broadcast Channel (BCH), a Paging Channel (PCH) or a Multicast Channel (MCH).

In addition, configuration information of the SC-MCCH may be carried in a System Information Block (SIB). For example, an SIB20 may include configuration information of the SC-MCCH. Optionally, one cell has one SC-MCCH only. The configuration information may include an SC-MCCH modification period, a repeat period, as well as radio frame and sub-frame configuration information. Optionally, the SC-MCCH modification period may indicate a change notification through one of 8 bits in DCI 1C. Optionally, the boundary of the modification period may be defined as SFN mod m=0, where m is the modification period (sc-mcch-ModificationPeriod) configured in the SIB20.

Figure 3:
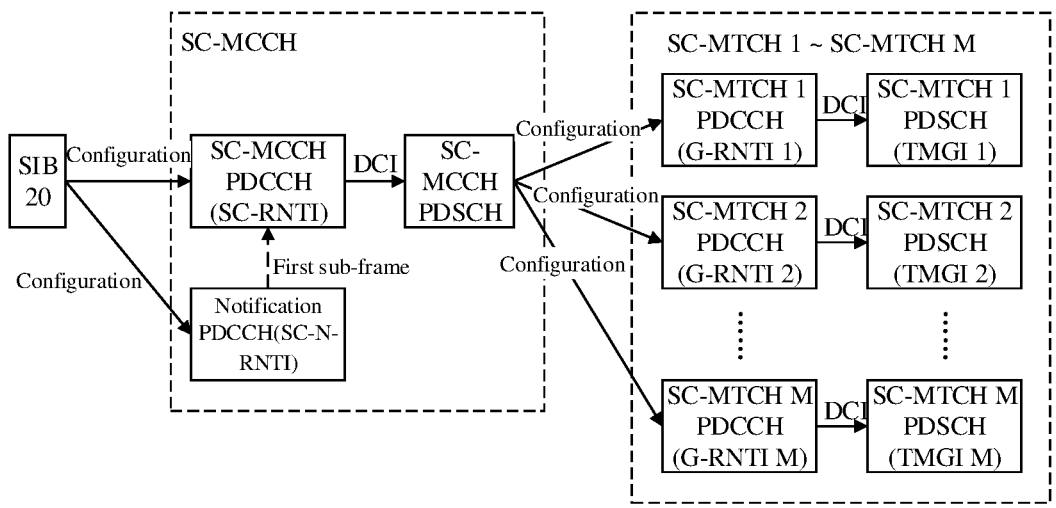
FIG. 3 is a schematic diagram of a configuration transmission mechanism according to an embodiment of the present disclosure.

FIG. 3 is a schematic diagram of a configuration transmission mechanism according to an embodiment of the present disclosure.

As illustrated in FIG. 3, the SIB20 may be configured with an SC-MCCH PDCCH, and may also be configured with a notification PDCCH. Optionally, the SC-MCCH PDCCH may be scrambled by a Single Cell Radio Network Temporary Identity (SC-RNTI), and/or the notification PDCCH may be scrambled by a Single Cell Notification RNTI (SC-N-RNTI). Downlink Control Information (DCI) in the SC-MCCH PDCCH may be configured for scheduling an SC-MCCH PDSCH. The SC-MCCH PDSCH may be configured with SC-MTCH 1 -SC-MTCH M. The SC-MTCH 1-SC-MTCH M may include SC-MTCH 1 PDCCH-SC-MTCH M PDCCH. DCI in the SC-MTCH 1 PDCCH-SC-MTCH M PDCCH may be configured for scheduling SC-MTCH 1 PDSCH-SC-MTCH M PDSCH. Optionally, the SC-MTCH 1 PDCCH-SC-MTCH M PDCCH may respectively be scrambled by Group RNTI (G-RNTI) 1~G-RNTI M. Optionally, the SC-MTCH 1 PDSCH-SC-MTCH M PDSCH may respectively carry Temporary Mobile Group Identity (TMGI) 1-TMGI M.

Main application scenarios of 5G include enhanced Mobile Broadband (eMBB), Ultra-Reliable and Low Latency Communication (URLLC), and massive Machine Type of Communication (mMTC).

The eMBB aims at obtaining multimedia content, services and data for users, the demand for which is growing very rapidly. Since the eMBB may be deployed in different scenarios, such as indoors, urban and rural, the capabilities and requirements of the eMBB vary considerably, such that it cannot be generalized, but need to be analyzed in detail with specific deployment scenarios. Typical applications of the URLLC include industrial automation, power automation, remote medical operation (surgery), traffic security assurance, etc. Typical characteristics of the mMTC include high connection density, small data volume, latency-insensitive services, low cost and long service life of modules, etc.

In a 5G network environment, in order to reduce air interface signaling, rapidly restoring wireless connection and rapidly restoring data services, a new Radio Resource Control (RRC) state, that is, an RRC_INACTIVE (deactivation) state, is defined. This state is different from an RRC_IDLE state and an RRC_CONNECTED state.

In the RRC_IDLE state: mobility is UE-based cell selection and reselection, paging is initiated by a Core Network (CN), and a paging area is configured by the CN. There is no UE Access Stratum (AS) context at a base station, and there is also no RRC connection.

In the RRC_CONNECTED state: there is an RRC connection, and there is UE AS context at a base station and UE. A network device knows a location of a UE to a cell level. Mobility is controlled by the network device. Unicast data may be transmitted between the UE and the base station.

In the RRC_INACTIVE state: mobility is UE-based cell selection and reselection; there is a connection between CN-NR; UE AS context is stored at a base station; paging is triggered by a Radio Access Network (RAN); an RAN-based paging area is managed by the RAN; and a network device knows a location of a UE to a RAN-based paging area level.

In 5G, a maximum channel bandwidth may be 400 MHZ (wideband carrier), and is large, compared with the maximum 20M bandwidth of LTE. If a UE remains operating on a wideband carrier, the power consumption of the UE may be increased. The power consumption of the UE may be optimized by a BandWidth Part (BWP). That is, a RF bandwidth of the UE may be adjusted according to the actual throughput of the UE. The use of a BWP may trigger the coexistence of a plurality of air interface parameter sets (Numerology) in one cell. A UE in an idle state or an inactive state resides on an initial BWP; the BWP is visible for the UE in the idle state or the inactive state. Information such as MIB, RMSI, and OSI having been subjected to paging may be acquired from the BWP.

Figure 4:
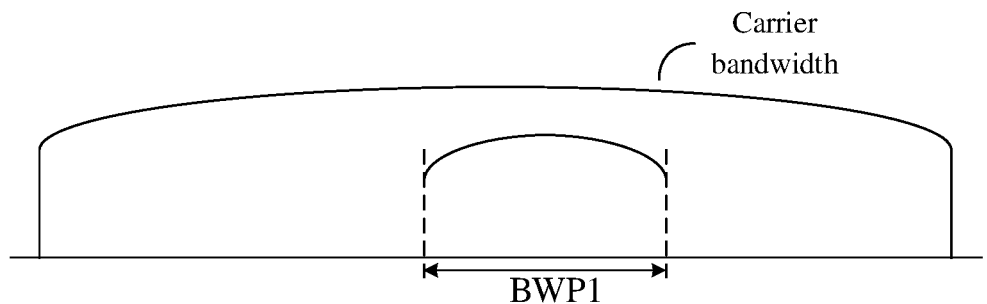
FIG. 4 to FIG. 6 are schematic block diagrams of a BWP of a terminal device according to an embodiment of the present disclosure.
Figure 5:
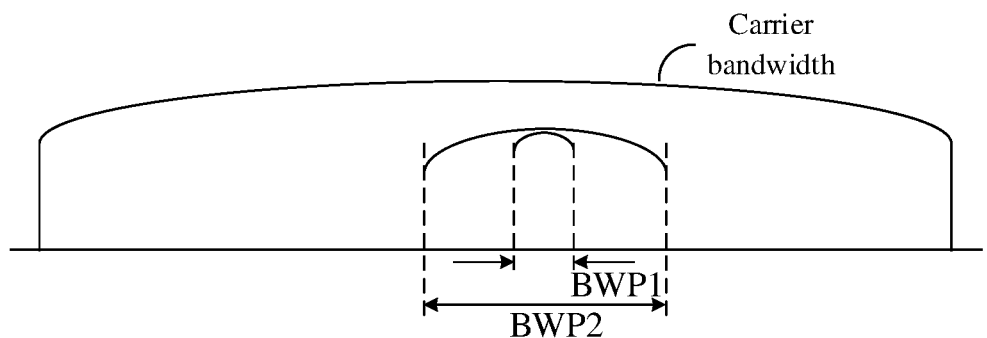
Figure 6:
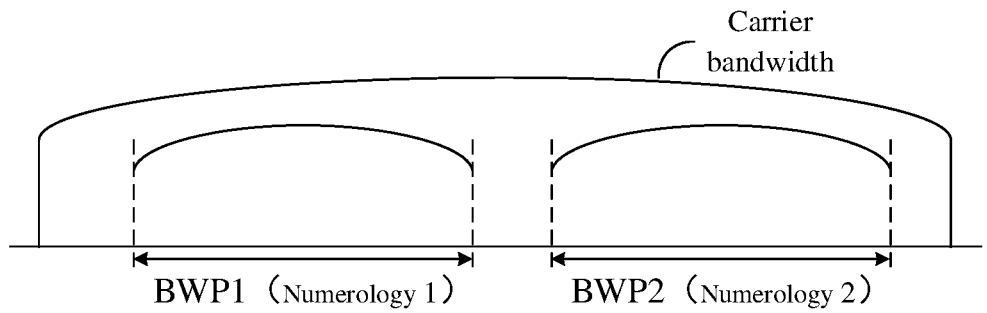

FIG. 4 to FIG. 6 are schematic block diagrams of a BWP of a terminal device according to an embodiment of the present disclosure.

For example, as illustrated in FIG. 4, when a rate of a UE is relatively low, partial bandwidth of a carrier bandwidth may be configured for the UE, for example, BWP1. In another example, as illustrated in FIG. 5, when the UE has high requirement for rate, a larger BWP may be configured for the UE, for example, BWP2 greater than BWP1. In another example, as illustrated in FIG. 6, when the UE supports a high rate or operates in a carrier aggregation (CA) mode, a plurality of BWPs may be configured, for example, BWP1 and BWP2. Optionally, BWP1 and BWP2 may respectively correspond to air interface parameter set 1 and air interface parameter set 2.

Up to 4 UL BWPs and up to 4 DL BWPs may be configured for one UE through RRC dedicated signaling, but at the same moment, only one DL BWP and UL BWP can be activated. The RRC dedicated signaling may indicate the first activated BWP in the configured BWPs. In addition, the UE in a connected state may also be switched between different BWPs through the DCI. After a carrier in an inactive state enters an active state, the first activated BWP is the first activated BWP configured in RRC. Configuration parameters of each BWP includes at least one of the following:

Sub-carrier spacing (subcarrierSpacing);
Cyclic prefix (cyclicPrefix);
First PRB of a BWP and the number of consecutive PRBs (locationAndBandwidth).
BWP identifier (bwp-Id); and BWP common configuration parameter (bwp-Common) and dedicated configuration parameter (bwp-Dedicated).

In an example, the value of the BWP id in RRC signaling may be 0 to 4, and 0 is considered as an initial BWP by default.

A BWP indicator in DCI is 2bit. When the number of the configured BWPs is less than or equal to 3, the BWP indicator may be 1, 2 or 3; and the BWP indicators 1, 2 and 3 respectively correspond to BWP ids 1, 2 and 3. When the number of the BWPs is 4, the BWP indicator may be 0, 1, 2 or 3. Optionally, the BWP indicators 0, 1, 2 and 3 respectively correspond to the BWPs, which are configured according to sequential indexes. Optionally, consecutive BWP ids are used when the BWPs are configured.

For ease of understanding of the solutions of the present disclosure, PUCCH resources in NR unicast communication are described below.

Before carrier aggregation is introduced into an LTE system, a resource for a PUCCH format 1a/1b transmitting ACK/NACK information corresponding to a dynamically-scheduled PDSCH may be obtained by calculating CCE occupied by DCI transmitted by the scheduled PDSCH. After carrier aggregation is introduced, a resource for a PUCCH format 3/4/5 transmitting ACK/NACK information corresponding to a dynamically-scheduled PDSCH is indicated by semi-static configuration and dynamic DCI. NR continues the use of working mechanism of the LTE to indicate a PUCCH which is for transmitting ACK/NACK information, that is, a PUCCH resource set is configured first through high-layer signaling, and then a PUCCH in the resource set is indicated through DCI.

Figure 7:
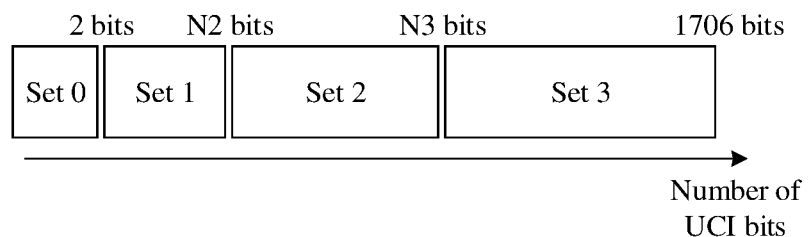
FIG. 7 is a schematic diagram of configuration of a PUCCH resource set according to an embodiment of the present disclosure.

FIG. 7 is a schematic diagram of configuration of a PUCCH resource set according to an embodiment of the present disclosure.

As illustrated in FIG. 7, up to 4 PUCCH resource sets (that is, set 0 to set 3) may be configured in NR, and the range of the number of bits of Uplink Control Information (UCI) carried in each resource set is different. For example, the range of the number of bits of the UCI carried in set 0 is 0-2; the range of the number of bits of UCI carried in set 1 is 3-N2; the range of the number of bits of UCI carried in set 2 is N2-N3; and the range of the number of bits of UCI carried in set 3 is N3-1706. Each set may include same or different PUCCH formats. A terminal device may determine one resource set from up to 4 resource sets based on the number of bits of the UCI to be transmitted. Then, a PUCCH resource may be determined from the set based on the indication of the DCI. The numbers in FIG. 7 are merely examples, and should not be construed as a restriction to the present disclosure.

In addition, a larger number of UEs in an actual system need to simultaneously feed back 1-bit or 2-bit ACK/NACK information. When a PUCCH indication information field in DCI is 2 bits, that is, each terminal device can only have 4 alternative PUCCH resources to transmit 1-bit or 2-bit ACK/NACK, resource conflicts is a serious problem in the system. Therefore, in NR DCI, 3 bits are used to indicate a PUCCH resource. For PUCCH set 0 (carrying 1-2-bit UCI), high-layer signaling may be configured with up to 32 PUCCH resources. When the number of the PUCCH resources is not greater than 8, the PUCCH resources may be directly determined based on the indication in DCI. When the number of the PUCCH resources is greater than 8, a PUCCH resource may be determined based on CCE indexes and 3-bit indication information in DCI. A specific method is illustrated as follows.

$$r_{PUCCH} = \begin{cases} \left\lfloor \frac{n_{CCE,P} \cdot \lceil R_{PUCCH}/8 \rceil}{N_{CC,E,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,P} \cdot \lfloor R_{PUCCH}/8 \rfloor}{N_{CC,E,p}} \right\rfloor + \Delta_{PRI} \cdot \\ \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

Where $r_{PUCCH}$ represents an index number of a PUCCH resource; $N_{CCE,p}$ represents the number of CCEs in a CORESET; $n_{CCE,p}$ represents an index number of a first CCE occupied by DCI; $R_{PUCCH}$ represents a total number of PUCCH resources; and PRI represents a value indicated by 3-bit indication information in the DCI.

For PUCCH sets 1, 2 and 3 (carrying UCI with over 2 bits), high-layer signaling may be configured with up to 8 PUCCH resources. A terminal device may determine a PUCCH resource to be used based on 3-bit indication information in DCI, and does not use an implicit resource determination method.

In NR, a PUCCH resource for unicast communication may be configured based on parameters in RRC signaling, as illustrated in Table 1.

TABLE 1

| | |
|---|---|
| PLICCH-ResourceSet ::= | SEQUENCE { |
| pucch-ResourceSetId | PUCCH-ResourceSeId. |
| resourceLiss | SEQUENCE (SIZE |
| (1...maxNrofPUCCH-ResourcesPerSet)) OF PUCCH-ResourceId, | |
| maxPayloadSize | INTEGER (4.256) |
| OPTIONAL -- Need R | |
| } | |
| PUCCH ResourceSetId ::= | INTEGER (0..maxNrofPUCCH-ResourceSets-1) |
| PUCCH-Resource ::= | SEQUENCE { |
| pucch-ResourceId | PUCCH-ResourceId, |
| startingPRB | PRB-Id, |
| intraSlotFrequency Hopping | ENUMERATED { enabled } |
| OPTIONAL, --Need R | |
| secondHopPRB | PRB-Id-Id |
| OPTIONAL, --Need R. | |
| Format | CHOICE{ |
| format0 | PUCCH-format0, |
| format1 | PUCCH-format1, |
| format2 | PUCCH-format2, |
| format3 | PUCCH-format3, |
| format4 | PUCCH-format4 |

TABLE 1-continued

```
    }
}
```

As illustrated in Table 1, PUCCH-ResourceSet is used for configuring a PUCCH resource set; the PUCCH resource set includes one or multiple PUCCH resources; the one or multiple PUCCH resources are configured by pucch-ResourceSetId; and maxPayloadSize is used for configuring the maximum number of bits allowed in a current PUCCH resource set. The pucch-ResourceSetId is associated with a PUCCH resource configuration (PUCCH-Resource). In each PUCCH resource configuration, startingPRB is used for indicating a starting PRB of a current PUCCH resource; intraSlotFrequencyHopping is used for indicating whether to activate intra-slot frequency hopping in the current PUCCH resource; and format is used for configuring a PUCCH format supported in the current PUCCH resource.

When the PUCCH format supported by the PUCCH resource is PUCCH format 0 (PUCCH Format 0), RRC layer signaling may further be used for configuring information of the PUCCH format 0, as illustrated in Table 2.

TABLE 2

```
PUCCH-format0 ::=        SEQUENCE {
    initialCyclicShift       INTEGER(0..11),
    nrofSymbols              INTEGER (1..2),
    startingSymbolIndex      INTEGER(0..13)
}
```

As illustrated in Table 2, when a PUCCH format supported by a PUCCH resource is PUCCH format 0, RRC layer signaling may include the following parameters for configuring PUCCH format 0: an initial cyclic shift (initialCyclicShift), the number of symbols (nrofSymbols), and a starting symbol (startingSymbolIndex). The PUCCH format 0 occupies one PRB in frequency domain, and occupies one or two symbols in time domain.

In NR, there is HARQ-ACK information feedback for unicast in a RRC connected state. However, a feedback mechanism is not introduced for multicasting and broadcasting in other systems. That is to say, feedback is not required when a UE receives multicast or broadcast services. In some service scenarios such as V2X and industrial Internet in NR, transmission needs to be performed in a multicast manner Since these services require increasingly high reliability, how to provide a feedback in response to multicast or broadcast is in need of consideration.

In the present disclosure, a feedback mechanism is introduced for multicasting and broadcasting services in NR MBS.

Specifically, two alternative HARQ-ACK feedback modes are provided for an NR MBS system, so as to ensure the reliability of service transmission, such that a network may determine whether retransmission is needed based on the feedback information. The first mode is a mode by which only NACK is fed back. A network sends MBS data, and among all terminal devices receiving the MBS data, a terminal device that receives the MBS data correctly does not send feedback information, while a terminal device that does not receive the MBS data correctly sends NACK information to the network. In this way, a plurality of terminal devices receiving the MBS data may send NACK-included HARQ feedback information through shared uplink resources. The second mode is a mode by which ACK and NACK are fed back. When a UE successfully receives MBS data from a base station, ACK is fed back, otherwise NACK is fed back. For ease of descriptions, the first feedback mode, that is, the mode of only feeding back NACK, is defined as a first feedback mode.

Based on the above, when the first feedback mode is supported, the type of physical channel for carrying feedback information and the manner of feeding back a plurality of information bits are may be taken into consideration.

Figure 8:
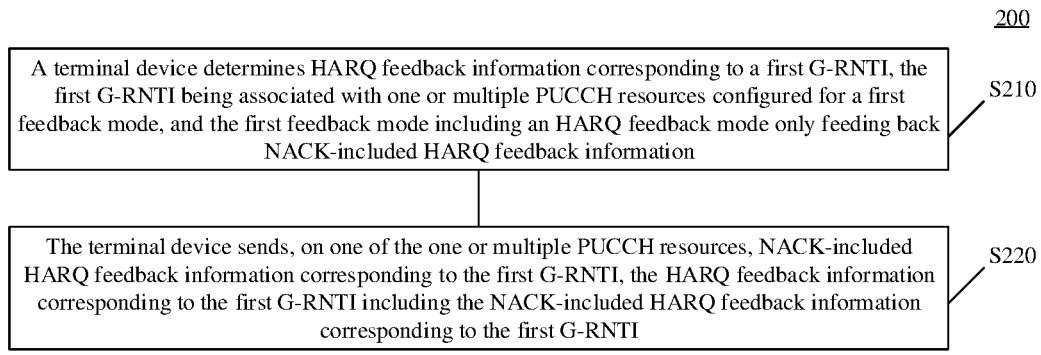
FIG. 8 is a schematic flowchart of a wireless communication method according to an embodiment of the present disclosure.

FIG. 8 is a schematic flowchart of a wireless communication method 200 according to an embodiment of the present disclosure. The method 200 may be executed by a terminal device, for example, the terminal device illustrated in FIG. 1.

As illustrated in FIG. 8, the method 200 may include the following operations.

At S210, a terminal device determines HARQ feedback information corresponding to a first G-RNTI. The first G-RNTI is associated with one or multiple PUCCH resources configured for a first feedback mode, and the first feedback mode includes an HARQ feedback mode only feeding back NACK-included HARQ feedback information.

At S220, the terminal device sends, on one of the one or multiple PUCCH resources, NACK-included HARQ feedback information corresponding to the first G-RNTI. The HARQ feedback information corresponding to the first G-RNTI includes the NACK-included HARQ feedback information corresponding to the first G-RNTI.

For example, within a slot for the one or multiple PUCCH resources, the terminal device may send, on one of the one or multiple PUCCH resources, the NACK-included HARQ feedback information corresponding to the first G-RNTI.

Based on the above technical solutions, the first G-RNTI is associated with the one or multiple PUCCH resources configured for the first feedback mode, such that the terminal device may send the NACK-included HARQ feedback information corresponding to the first G-RNTI on one of the one or multiple PUCCH resources. Therefore, feedback can be provided for multicast or broadcast, such that a network may determine, based on the feedback, whether data needs to be retransmitted, thereby ensuring the reliability of service transmission.

It is to be noted that, in the embodiment of the present disclosure, the one or multiple PUCCH resources may be configured by high-layer signaling. Optionally, the one or multiple PUCCH resources may be shared resources, so as to improve a resource utilization rate. The specific implementation forms of the one or multiple PUCCH resources are not limited In the embodiment of the present disclosure. The one or multiple PUCCH resources are described below with reference to specific embodiments.

Embodiment 1-1

In the embodiment, the one or multiple PUCCH resources may be a PUCCH resource.

In other words, the terminal device is configured with one or multiple PUCCH resources configured for the first feedback mode. The PUCCH resources correspond to different G-RNTIs.

In the embodiment, the terminal device may determine the PUCCH resources configured for the first feedback mode. Each of the PUCCH resources configured for the first feedback mode is associated with one G-RNTI, that is, the RRC layer signaling configuring the PUCCH resource for the first feedback mode may indicate a value of the G-RNTI associated with the PUCCH resource or an index of the G-RNTI associated with the PUCCH resource. The G-RNTI is at least used for scrambling a PDCCH which is for scheduling a PDSCH carrying MBS transmission. In the embodiment, when the terminal device is configured with a plurality of G-RNTIs, any one of the G-RNTIs may be configured with a PUCCH resource configured for the first feedback mode and corresponding to the G-RNTI. For example, the one or multiple PUCCH resources configured for the first feedback mode that are configured by the terminal device belong to a same PUCCH resource set.

FIG. 9 is a schematic diagram of an association relationship between a PUCCH resource and a G-RNTI according to an embodiment of the present disclosure.

As illustrated in FIG. 9, PUCCH resource #0-PUCCH resource #U-1 are respectively associated with G-RNTI #0-G-RNTI #M-1.

In the embodiment, when the PUCCH format supported by the PUCCH resource configured for the first feedback mode is PUCCH format 0, the RRC layer signaling may further include the following parameters for configuring PUCCH format 0: an initial cyclic shift (initialCyclicShift), the number of symbols (nrofSymbols), and a starting symbol (startingSymbolIndex). PUCCH format 0 occupies one PRB in frequency domain, and occupies one or two symbols in time domain.

Embodiment 1-2

In the embodiment, the one or multiple PUCCH resources may be a PUCCH resource set.

In other words, the terminal device is configured with one or multiple PUCCH resource sets configured for the first feedback mode. The PUCCH resource sets correspond to different G-RNTIs.

In the embodiment, the terminal device may determine PUCCH resource sets configured for the first feedback mode. Each of the PUCCH resource sets configured for the first feedback mode is associated with a G-RNTI, that is, the RRC layer signaling configuring a PUCCH resource set used for the first feedback mode may indicate a value of a G-RNTI associated with the PUCCH resource set or an index of the G-RNTI associated with the PUCCH resource set. The G-RNTI is at least used for scrambling a PDCCH which is for scheduling a PDSCH carrying MBS transmission. Each of the PUCCH resource sets configured for the first feedback mode includes one or multiple PUCCH resources configured for the first feedback mode. In the embodiment, when the terminal device is configured with a plurality of G-RNTIs, any one of the G-RNTIs may be configured with a PUCCH resource set used for the first feedback mode and corresponding to the G-RNTI.

In an implementation, when there are a plurality of PUCCH resources in the PUCCH resource set used for the first feedback mode, the starting PRB of each PUCCH resource may be configured by the RRC signaling.

In an implementation, when the PUCCH format supported by each PUCCH resource is PUCCH format 0, the initial cyclic shift and starting symbol index of PUCCH format 0 at each PUCCH resource may be configured by the RRC signaling.

FIG. 10 is a schematic diagram of an association relationship between a PUCCH resource set and a G-RNTI according to an embodiment of the present disclosure.

As illustrated in FIG. 10, PUCCH resource set #0-PUCCH resource set #M-1 are respectively associated with G-RNTI #0-G-RNTI #S-1. Each PUCCH resource set among PUCCH resource set #0-PUCCH resource set #M-1 respectively includes PUCCH resource #0-PUCCH resource #U-1.

From the above, it can be learned that, the one or multiple PUCCH resources configured for the first feedback mode and associated with the first G-RNTI may be a PUCCH resource associated with the first G-RNTI, or may be a PUCCH resource set associated with the first G-RNTI.

In addition, the HARQ feedback information corresponding to the first G-RNTI may be HARQ feedback information of the PDSCH scheduled by the PDCCH which is scrambled by using the first G-RNTI, or may be HARQ feedback information of the PDCCH scrambled by the first G-RNTI and used for indicating SPS release (that is, HARQ feedback information released by SPS). The embodiment of the present disclosure is not limited thereto. When the PDSCH only carries a Transmission Block (TB), the HARQ feedback information of the PDSCH is 1 bit; when 2 TBs are carried, the HARQ feedback information of the PDSCH is 2 bits. When the terminal device successfully decodes a TB, an HARQ feedback bit corresponding to the TB is ACK, that is, a bit value is 1, otherwise the bit value is 0.

In some embodiments, the first G-RNTI may be associated with a PUCCH resource. S220 may include the following operation.

The terminal device may send, on the PUCCH resource associated with the first G-RNTI, 1-bit NACK-included HARQ feedback information corresponding to the first G-RNTI.

In other words, the manner of configuring the PUCCH resources configured for the first feedback mode in Embodiment 1-1 may be used. When the terminal device needs to feed back, within a slot u where the PUCCH resource associated with the first G-RNTI is located, M-bit HARQ feedback information corresponding to the first G-RNTI, M≥1, and if one bit in the M-bit HARQ feedback information is 0 (that is, there is one piece of feedback information in the M-bit HARQ feedback information being NACK), the terminal device may send, on the PUCCH resource configured for the first feedback mode and corresponding to the first G-RNTI, the HARQ feedback information corresponding to the first G-RNTI and with the feedback information being NACK, otherwise the terminal device does not send any information.

The first G-RNTI may also be associated with a plurality of PUCCH resources. The terminal device may send, on the plurality of PUCCH resources associated with the first G-RNTI, NACK-included HARQ feedback information having a plurality of bits corresponding to the first G-RNTI. This embodiment of the present disclosure is not specifically limited thereto.

In some embodiments of the present disclosure, the terminal device may determine, within a slot for one or multiple PUCCH resources, M-bit HARQ feedback information corresponding to the first G-RNTI, where M≥1. Based on this, the terminal device may send, on one of the one or multiple PUCCH resources, NACK-included HARQ feedback information corresponding to the first G-RNTI in the M-bit HARQ feedback information.

In some embodiments of the present disclosure, the terminal device may determine, within a slot for one or multiple PUCCH resources, M-bit HARQ feedback information corresponding to the first G-RNTI, where M≥1. The first G-RNTI is associated with a PUCCH resource set. S220 may include the following operations.

Based on a bit state of the M-bit HARQ feedback information, the terminal device may determine, from the PUCCH resource set associated with the first G-RNTI, the PUCCH resource configured for sending the NACK-included HARQ feedback information corresponding to the first G-RNTI; and the terminal device may send the NACK-included HARQ feedback information corresponding to the first G-RNTI on the PUCCH resource configured for sending the NACK-included HARQ feedback information corresponding to the first G-RNTI.

In other words, the terminal device has, within a slot, M pieces of HARQ feedback information for one G-RNTI. Different PUCCH resources may be used for the feedback information in different bit states, where M≥1. For example, the terminal device has, within a slot, 2 pieces of HARQ feedback information for one G-RNTI. When the 2 pieces of HARQ feedback information for one G-RNTI is 00, 01 or 10, the PUCCH resources used are different.

That is to say, the mode of configuring the PUCCH resources for the first feedback mode in Embodiment 1-2 may be used. When the terminal device needs to feed back, within a slot u of the PUCCH resource set associated with the first G-RNTI, M-bit HARQ feedback information corresponding to the first G-RNTI, M≥1, based on the bit state of the M-bit HARQ feedback information, the terminal device may determine, from the PUCCH resource set used for the first feedback mode and associated with the first G-RNTI, the PUCCH resources to be used, and send, on the determined PUCCH resources, the NACK-included HARQ feedback information corresponding to the first G-RNTI.

In the embodiment, the configuration information of the PUCCH resources may at least indicate starting PRBs of the PUCCH resources in the PUCCH resource set, and, when the PUCCH resources are used to support PUCCH format 0, the configuration information may indicate the initial cyclic shift and starting symbol of the PUCCH format 0. For example, for any two PUCCH resources in the PUCCH resource set used for the first feedback mode, three parameters that respectively are the starting PRBs of the two PUCCH resources, the initial cyclic shifts of the PUCCH format 0 and the starting symbols of the PUCCH format 0 are not all the same. For example, different PUCCHs in the same PUCCH resource set used for the first feedback mode occupy different PRBs and different symbols.

In an implementation, when M is less than or equal to N, based on the bit state of the M-bit HARQ feedback information, the terminal device may determine, from the PUCCH resource set associated with the first G-RNTI, the PUCCH resource configured for sending the NACK-included HARQ feedback information corresponding to the first G-RNTI. $N=\lfloor \log2(K+1) \rfloor$, $\lfloor \ \rfloor$ represents rounding down, and K represents the number of PUCCH resources in the PUCCH resource set associated with the first G-RNTI.

In other words, when there are K PUCCH resources in the PUCCH resource set used for the first feedback mode and associated with the first G-RNTI, the terminal device does not expect that, within the slot u, the number of bits of the HARQ feedback information corresponding to the first G-RNTI is greater than $\lfloor \log2(K+1) \rfloor$.

As an example, M=2, K is 3, and the terminal device may determine, according to the table below, the PUCCH resources to be used.

TABLE 3

| Bit state of 2-bit HARQ feedback information | PUCCH resources used in PUCCH resource set used for first feedback mode and corresponding to first G-RNTI |
| --- | --- |
| 00 | First PUCCH resource |
| 01 | Second PUCCH resource |
| 10 | Third PUCCH resource |
| 11 | Not send any PUCCH |

As illustrated in Table 3, when the bit state of the 2-bit HARQ feedback information is 00, a PUCCH is sent by using the first PUCCH resource in the PUCCH resource set used for the first feedback mode and corresponding to the first G-RNTI. When the bit state of the 2-bit HARQ feedback information is 01, a PUCCH is sent by using the second PUCCH resource in the PUCCH resource set used for the first feedback mode and corresponding to the first G-RNTI. When the bit state of the 2-bit HARQ feedback information is 10, a PUCCH is sent by using the third PUCCH resource in the PUCCH resource set used for the first feedback mode and corresponding to the first G-RNTI. When the bit state of the 2-bit HARQ feedback information is 11, no PUCCH is sent.

In an implementation, when M is greater than N, the method 200 may further include the following operations.

The terminal device divides the M-bit HARQ feedback information into S feedback information groups, where S is less than or equal to N; the terminal device converts the HARQ feedback information included in each of the S feedback information groups into 1-bit HARQ feedback information for the feedback information group, to obtain the HARQ feedback information comprised in the S feedback information groups; based on a bit state of the HARQ feedback information for the S feedback information groups, the terminal device determines, from the PUCCH resource set associated with the first G-RNTI, PUCCH resources configured for sending NACK-included HARQ feedback information comprised in the S feedback information groups, where the HARQ feedback information in the S feedback information groups includes the NACK-included HARQ feedback information in the S feedback information groups; and the terminal device sends, on the PUCCH resources configured for sending the NACK-included HARQ feedback information in the S feedback information groups, the NACK-included HARQ feedback information in the S feedback information groups.

As an example, when there are 3 PUCCH resources in the PUCCH resource set used for the first feedback mode and associated with the first G-RNTI, and the number of bits of the HARQ feedback information corresponding to the first G-RNTI that needs to be fed back by the terminal device within the slot u is greater than 2, the terminal device may divide all the HARQ feedback information into two groups. The HARQ feedback information in each group is combined into 1-bit HARQ feedback information through an "AND" operation, and an operational rule of the "AND" operation is 0&0=0; 0&1=0; 1&0=0; and 1&1=1; and then, the terminal device may feed back the finally-determined 2-bit HARQ feedback information through the above modes. For example, the terminal device needs to feed back, within the slot u, 2 PDSCHs scheduled by the PDCCH which is scrambled by the first G-RNTI. Each PDSCH carries two TBs, and then the terminal device may perform the "AND"

operation on HARQ information bits of the two TBs in each PDSCH, so as to obtain the 1-bit HARQ feedback information.

In an implementation, different PUCCH resources in the PUCCH resource set associated with the first G-RNTI are configured for sending the HARQ feedback information in different bit states.

In an implementation, the terminal device is configured with one or multiple PUCCH resource sets configured for the first feedback mode; different PUCCH resource sets in the one or multiple PUCCH resource sets correspond to different G-RNTIs; and the one or multiple PUCCH resource sets include the PUCCH resource set associated with the first G-RNTI. Optionally, the initial cyclic shifts of PUCCH format 0, and the starting symbols of PUCCH format 0, and starting PRBs of any two PUCCH resources in each of the one or multiple PUCCH resource sets are not all the same.

In some embodiments of the present disclosure, the terminal device may determine, within a slot for one or multiple PUCCH resources, M-bit HARQ feedback information corresponding to the first G-RNTI, where M>1. The first G-RNTI is associated with the PUCCH resource. S220 may include the following operations.

Based on the bit state of the M-bit HARQ feedback information, the terminal device determines, from the PUCCH resource associated with the first G-RNTI, a PRB and/or a symbol configured for sending NACK-included HARQ feedback information corresponding to the first G-RNTI; and the terminal device sends, on the PRB and/or the symbol configured for sending the NACK-included HARQ feedback information corresponding to the first G-RNTI, the NACK-included HARQ feedback information corresponding to the first G-RNTI.

In other words, the terminal device has, within a slot, M pieces of HARQ feedback information for one G-RNTI. Different PRBs and/or symbols are used for the feedback information in different bit states, where M≥1. For example, the terminal device has, within a slot, 2 pieces of HARQ feedback information for one G-RNTI. When the 2 pieces of HARQ feedback information for one G-RNTI is 00, 01 or 10, the PRBs and/or symbols used are different.

In the embodiment, when the terminal device is within the slot u of the PUCCH resources associated with the first G-RNTI, the HARQ feedback information corresponding to the first G-RNTI is the M-bit HARQ feedback information, M≥1, the terminal device may determine, a manner of sending the PUCCH on the PUCCH resources configured for the first feedback mode and corresponding to the first G-RNTI based on the bit state of the M-bit HARQ feedback information.

In an implementation, the PUCCH resource associated with the first G-RNTI may include T*F PRBs, where T≥1 and F≥1; and T represents the number of symbols included in the PUCCH resource, and F represents the number of PRBs included in a PUCCH resource frequency domain. Optionally, F>1, F PRBs are consecutive.

That is, the mode of configuring the PUCCH resources configured for the first feedback mode in Embodiment 1-1 is used. Furthermore, each of the PUCCH resources configured for the first feedback mode includes T*F PRBs.

In an implementation, when M is less than or equal to P, the terminal device may determine, based on the bit state of the M-bit HARQ feedback information, the PRB and/or the symbol configured for sending the NACK-included HARQ feedback information corresponding to the first G-RNTI from the PUCCH resource associated with the first G-RNTI, where P represents the number of PRBs in the PUCCH resource associated with the first G-RNTI.

In other words, when there are K PRBs included in the PUCCH resources configured for the first feedback mode and associated with the first G-RNTI, the terminal device does not expect, within the slot u, to feed back the HARQ feedback information corresponding to the first G-RNTI and greater than K bits.

As an example, assuming that T=1 and F=2, and if M=2, the terminal device may determine, according to the table below, a manner of sending a PUCCH on the PUCCH resources configured for the first feedback mode.

TABLE 4

| Bit state of 2-bit HARQ feedback information | Manner of sending a PUCCH on PUCCH resources configured for first feedback mode and corresponding to first G-RNTI |
|---|---|
| 00 | Send a PUCCH on first and second PRBs of PUCCH resources |
| 01 | Send a PUCCH on first PRB of PUCCH resources, and not send any information on second PRB of PUCCH resources |
| 10 | Send a PUCCH on second PRB of PUCCH resources, and not send any information on first PRB of PUCCH resources |
| 11 | Not send any PUCCH |

As illustrated in Table 4, when the bit state of the 2-bit HARQ feedback information is 00, a PUCCH is sent by the first and second PRBs in the PUCCH resources. When the bit state of the 2-bit HARQ feedback information is 01, a PUCCH is sent on the first PRB of the PUCCH resources, and no information is sent on the second PRB of the PUCCH resources. When the bit state of the 2-bit HARQ feedback information is 10, a PUCCH is sent on the second PRB of the PUCCH resources, and no information is sent on the first PRB of the PUCCH resources. If the bit state of the 2-bit HARQ feedback information is 11, no PUCCH is sent.

As another example, assuming that T=2 and F=1, and if M=2, the terminal device may determine, according to the table below, a manner of sending a PUCCH on the PUCCH resources configured for the first feedback mode.

TABLE 5

| Bit state of 2-bit HARQ feedback information | Manner of sending a PUCCH on PUCCH resources configured for first feedback mode and corresponding to first G-RNTI |
|---|---|
| 00 | Send a PUCCH on first and second symbols of PUCCH resources |
| 01 | Send a PUCCH on first symbol of PUCCH resources, and not send any information on second symbol of PUCCH resources |
| 10 | Send a PUCCH on second symbol of PUCCH resources, and not send any information on first symbol of PUCCH resources |
| 11 | Not send any PUCCH |

As illustrated in Table 5, when the bit state of the 2-bit HARQ feedback information is 00, a PUCCH is sent at the first and second symbols in the PUCCH resources. When the bit state of the 2-bit HARQ feedback information is 01, a PUCCH is sent at the first symbol of the PUCCH resources, and no information is sent at the second symbol of the PUCCH resources. When the bit state of the 2-bit HARQ feedback information is 10, a PUCCH is sent at the second symbol of the PUCCH resources, and no information is sent at the first symbol of the PUCCH resources. When the bit state of the 2-bit HARQ feedback information is 11, no PUCCH is sent.

As another example, assuming that T=2 and F=2, and if M=4, the terminal device may determine, according to the table below, a manner of sending a PUCCH at the first symbol and the second symbol of the PUCCH resources configured for the first feedback mode.

TABLE 6

| Bit state of first 2-bit HARQ feedback information | Manner of sending a PUCCH at 1st symbol of PUCCH resources configured for first feedback mode and corresponding to first G-RNTI |
|---|---|
| 00 | Send a PUCCH at first and second PRBs of 1st symbol of PUCCH resources |
| 01 | Send a PUCCH at first PRB of 1st symbol of PUCCH resources, and not send any information at second PRB of PUCCH resources |
| 10 | Send a PUCCH at second PRB of 1st symbol of PUCCH resources, and not send any information at first PRB of PUCCH resources |
| 11 | Not send a PUCCH at 1st symbol of PUCCH resources |

As illustrated in Table 6, when the bit state of the first 2-bit HARQ feedback information is 00, a PUCCH is sent at the first and second PRBs of the 1st symbol of the PUCCH resources. When the bit state of the first 2-bit HARQ feedback information is 01, a PUCCH is sent at the first PRB of the 1st symbol of the PUCCH resources, and no information is sent at the second PRB of the PUCCH resources. When the bit state of the first 2-bit HARQ feedback information is 10, a PUCCH is sent at the second PRB of the 1st symbol of the PUCCH resources, and no information is sent at the first PRB of the PUCCH resources. When the bit state of the first 2-bit HARQ feedback information is 11, a PUCCH is not sent at the 1st symbol of the PUCCH resources.

As another example, assuming that T=2 and F=2, and if M=4, the terminal device determines, according to the table below, a manner of sending a PUCCH at the first symbol and the second symbol of the PUCCH resources configured for the first feedback mode.

TABLE 7

| Bit state of last 2-bit HARQ feedback information | Manner of sending a PUCCH at 2nd symbol of PUCCH resources configured for first feedback mode and corresponding to first G-RNTI |
|---|---|
| 00 | Send a PUCCH at first and second PRBs of 2nd symbol of PUCCH resources |
| 01 | Send a PUCCH at first PRB of 2nd symbol of PUCCH resources, and not send any information at second PRB of PUCCH resources |
| 10 | Send a PUCCH at second PRB of 2nd symbol of PUCCH resources, and not send any information at first PRB of PUCCH resources |
| 11 | Not send PUCCH at 2nd symbol of PUCCH resources |

As illustrated in Table 7, when the bit state of the last 2-bit HARQ feedback information is 00, a PUCCH is sent at the first and second PRBs of the 2nd symbol of the PUCCH resources. When the bit state of the last 2-bit HARQ feedback information is 01, a PUCCH is sent at the first PRB of the 2nd symbol of the PUCCH resources, and no information is sent at the second PRB of the PUCCH resources. When the bit state of the last 2-bit HARQ feedback information is 10, a PUCCH is sent at the second PRB of the 2nd symbol of the PUCCH resources, and no information is sent at the first PRB of the PUCCH resources. When the bit state of the last 2-bit HARQ feedback information is 11, the PUCCH is not sent at the 2nd symbol of the PUCCH resources.

In an implementation, when M is greater than P, the method 200 may further include the following operations.

The terminal device divides the M-bit HARQ feedback information into S feedback information groups, where S is less than or equal to P; the terminal device converts the HARQ feedback information comprised in each of the S feedback information groups into 1-bit HARQ feedback information for the feedback information group, to obtain HARQ feedback information comprised in the S feedback information groups; based on the bit state of the HARQ feedback information comprised in the S feedback information groups, the terminal device determines, from the PUCCH resource associated with the first G-RNTI, resources or symbols configured for sending NACK-included HARQ feedback information included in the S feedback information groups, wherein the HARQ feedback information comprised in the S feedback information groups includes the NACK-included HARQ feedback information comprised in the S feedback information groups; and the terminal device sends, at the resources or the symbols configured for sending the NACK-included HARQ feedback information comprised in the S feedback information groups, the NACK-included HARQ feedback information comprised in the S feedback information groups.

As an example, when there are 2 PRBs in the PUCCH resources configured for the first feedback mode and associated with the first G-RNTI, and the number of bits of the HARQ feedback information corresponding to the first G-RNTI that needs to be fed back by the terminal device within the slot u is greater than 2, the terminal device may divide all the HARQ feedback information into two groups. The HARQ feedback information in each group is combined into 1-bit HARQ feedback information by an "AND" operation, and an operational rule of the "AND" operation is 0&0=0; 0&1=0; 1&0=0; and 1&1=1; and then, the terminal device may feed back the finally-determined 2-bit HARQ feedback information by the above modes. For example, the terminal device needs to feed back, within the slot u, 2 PDSCHs scheduled by the PDCCH which is scrambled by the first G-RNTI. Each PDSCH carries two TBs, and then the terminal device may perform the "AND" operation on HARQ information bits of the two TBs in each PDSCH, to obtain the 1-bit HARQ feedback information.

In an implementation, different PRBs or different symbols in the PUCCH resources associated with the first G-RNTI are configured for sending the HARQ feedback information in different bit states.

In an implementation, the terminal device is configured with at least one PUCCH resource configured for the first feedback mode; different PUCCH resources among the at least one PUCCH resource correspond to different G-RNTIs; and the at least one PUCCH resource includes the PUCCH resource associated with the first G-RNTI. Optionally, the at least one PUCCH resource may belong to a same PUCCH resource set.

In some embodiments of the present disclosure, the terminal device may perform AND operation on the HARQ feedback information in each feedback information group, so as to obtain the HARQ feedback information for the feedback information group.

In some embodiments of the present disclosure, the terminal device may classify feedback information of all TBs carried in a PDSCH scheduled by a PDCCH scrambled by using the first G-RNTI into a feedback information group.

In some embodiments of the present disclosure, the method 200 may further include the following operation.

The terminal device receives resource configuration information. The resource configuration information includes at least one G-RNTI and information of a resource configured for the first feedback mode and associated with each of the at least one G-RNTI. The at least one G-RNTI includes the first G-RNTI.

In some embodiments of the present disclosure, when the PUCCH resource supports PUCCH format 0, the resource configuration information may further include a cyclic shift and a starting symbol, which are configured for indicating the PUCCH format 0.

In some embodiments of the present disclosure, the information of the resource configured for the first feedback mode and associated with each G-RNTI may include information used for indicating a starting PRB of the resource.

In some embodiments of the present disclosure, S220 may include the following operation.

The terminal device sends, within a slot n+k, the NACK-included HARQ feedback information corresponding to the first G-RNTI. The slot n is a slot where a PDSCH detected by the terminal device and scheduled by the PDCCH scrambled by using the first G-RNTI is located, or is a slot where a PDCCH detected by the terminal device, scrambled by using the first G-RNTI and used for indicating Semi-Persistent Scheduling (SPS) release is located, where k≥0. Optionally, a value of k may be indicated by the PDCCH which schedules the PDSCH, or the value of k may be indicated by the PDCCH configured for indicating SPS release, or the value of k may be configured by high-layer signaling. Optionally, the slot n may be a slot where a last symbol of the PDSCH detected by the terminal device, scheduled by the PDCCH scrambled by using the first G-RNTI is located, or may be a slot where a last symbol of the PDCCH detected by the terminal device, scrambled by using the first G-RNTI and used for indicating SPS release is located. The operation that the terminal device detects the PDCCH or the PDSCH may be understood as the detection of the last symbol of the PDCCH or the PDSCH.

In other words, when the terminal device detects, within a range of the slot n, the PDSCH scheduled by the PDCCH scrambled by the first G-RNTI, or the terminal device detects, within the slot n, the PDCCH scrambled by the first G-RNTI and used for indicating SPS release, the terminal feeds back, at a slot n+k, the HARQ feedback information for the PDSCH or SPS release.

In some embodiments of the present disclosure, the NACK-included HARQ feedback information corresponding to the first G-RNTI may be the PUCCH format 0. The method may further include the following operation.

Based on the following formula, it is determined that a cyclic shift $\alpha_l$ of a PUCCH of which PUCCH format is a format 0.

$$\alpha_l = 2\pi/N_{sc}^{RB}((m_0 + n_{cs}(n_{s,f}^\mu l + l')) \bmod N_{sc}^{RB})$$

Where, $m_0$ represents an initial cyclic shift used by the PUCCH format 0 indicated in the configuration information of the PUCCH resource configured for the first feedback mode; $n_{cs}(n_{s,f}^\mu l + l')$ represents a random number which is determined based on a sending slot and a sending symbol of the PUCCH; l represents an index of a current symbol relative to a starting symbol of the PUCCH; l' represents the starting symbol of the PUCCH; and $N_{sc}^{RB}$ NscRB represents the number of sub-carriers in a PRB.

The preferred implementations of the present disclosure are described in detail above with reference to the drawings. The present disclosure is not limited to the specific details in the above implementations, and within the scope of the technical concept of the present disclosure, various simple modifications may be made to the technical solutions of the present disclosure, and these simple modifications all fall within the protection scope of the present disclosure. For example, each specific technical feature described in the above specific implementations may be combined in any suitable manner without contradiction. In order to avoid unnecessary repetition, various possible combinations are not described separately in the present disclosure. For another example, the various implementations of the present disclosure may also be combined arbitrarily, as long as without departing from the spirit of the present disclosure, and should also be regarded as the contents disclosed in the present disclosure.

It should also be understood that, in various method embodiments of the present disclosure, the sequence number of each process does not mean the sequence of execution. The execution sequence of each process should be determined by its functions and internal logic, which should not constitute any limitation on the implementation process of the embodiments of the present disclosure. In addition, in the embodiments of the present disclosure, the terms "downlink" and "uplink" are configured to indicate the transmission direction of a signal or data. Herein, "downlink" is configured to indicate that the transmission direction of the signal or data is a first direction sent from a site to a UE of a cell, and "uplink" is configured to indicate that the transmission direction of signals or data is a second direction sent from the UE of the cell to the site. For example, a "downlink signal" indicates that the transmission direction of the signal is the first direction. In addition, in the embodiments of the present disclosure, the term "and/or" is merely an association relationship describing related objects, which means that there may be three relationships. Specifically, A and/or B may indicate three cases: A exists alone, A and B exist simultaneously, and B exists alone. In addition, the character "/" in this paper generally indicates that the related objects are in an "or" relationship.

The method in the embodiments of the present disclosure is described in detail above from the perspective of the terminal device. The method in the embodiments of the present disclosure is described below from the perspective of the network device with reference to FIG. 11.

FIG. 11 is a schematic flowchart of a wireless communication method 300 according to an embodiment of the present disclosure. The method 300 may be executed by the network device illustrated in FIG. 1.

As illustrated in FIG. 11, the method 300 may include the following operations.

At S310, a network device receives, on one or multiple PUCCH resources configured for a first feedback mode and associated with a first G-RNTI, NACK-included HARQ feedback information corresponding to the first G-RNTI. The first feedback mode includes an HARQ feedback mode only feeding back NACK-included HARQ feedback information.

In some embodiments of the present disclosure, the first G-RNTI may be associated with a PUCCH resource. S310 may include the following operation.

The network device receives, on the PUCCH resource associated with the first G-RNTI, 1-bit NACK-included HARQ feedback information corresponding to the first G-RNTI.

In some embodiments of the present disclosure, the first G-RNTI may be associated with a PUCCH resource set.

In some embodiments of the present disclosure, different PUCCH resources in the PUCCH resource set associated with the first G-RNTI may be configured for sending the HARQ feedback information in different bit states.

In some embodiments of the present disclosure, one or multiple PUCCH resource sets for the first feedback mode may be configured by the network device for a terminal device; different PUCCH resource sets in the one or multiple PUCCH resource sets correspond to different G-RNTIs; and the one or multiple PUCCH resource sets include the PUCCH resource set associated with the first G-RNTI.

In some embodiments of the present disclosure, initial cyclic shifts of PUCCH format 0, and the starting symbols of the PUCCH format 0, and starting PRBs of any two PUCCH resources in each of the one or multiple PUCCH resource sets are not all the same.

In some embodiments of the present disclosure, the first G-RNTI may be associated with a PUCCH resource.

In some embodiments of the present disclosure, the PUCCH resource associated with the first G-RNTI may include T*F PRBs, where T≥1 and F≥1; and T represents the number of symbols comprised in the PUCCH resource, and F represents the number of PRBs included in a PUCCH resource frequency domain.

In some embodiments of the present disclosure, F>1, F PRBs are consecutive.

In some embodiments of the present disclosure, different PRBs or different symbols in the PUCCH resources associated with the first G-RNTI are configured for sending the HARQ feedback information in different bit states.

In some embodiments of the present disclosure, at least one PUCCH resource for the first feedback mode may be configured by the network device for the terminal device; different PUCCH resources among the at least one PUCCH resource correspond to different G-RNTIs; and the at least one PUCCH resource includes the PUCCH resource associated with the first G-RNTI.

In some embodiments of the present disclosure, the at least one PUCCH resource may belong to a same PUCCH resource set.

In some embodiments of the present disclosure, the method 300 may further include the following operation.

The network device sends resource configuration information. The resource configuration information includes at least one G-RNTI, and information of a resource configured for the first feedback mode and associated with each of the at least one G-RNTI, the at least one G-RNTI including the first G-RNTI.

In some embodiments of the present disclosure, when the PUCCH resource supports PUCCH format 0, the resource configuration information may further include a cyclic shift and a starting symbol, which are configured for indicating the PUCCH format 0.

In some embodiments of the present disclosure, the information of the resource configured for the first feedback mode and associated with each G-RNTI may include information used for indicating a starting PRB of the resource.

In some embodiments of the present disclosure, the NACK-included HARQ feedback information corresponding to the first G-RNTI may be PUCCH format 0. The method 300 may further include the following operation.

Based on the following formula, it is determined that a cyclic shift $\alpha_l$ of a PUCCH of which PUCCH format is a format 0.

$$\alpha_l = 2\pi/N_{sc}^{RB}((m_0+n_{cs}(n_{s,f}^{\mu}l+l'))\bmod N_{sc}^{RB})$$

Where, $m_0$ represents an initial cyclic shift used by the PUCCH format 0 indicated in the configuration information of the PUCCH resource configured for the first feedback mode; $n_{cs}(n_{s,f}^{\mu}l+l')$ represents a random number which is determined based on a sending slot and a sending symbol of the PUCCH; l represents an index of a current symbol relative to a starting symbol of the PUCCH; l' represents the starting symbol of the PUCCH; and $N_{sc}^{RB}$ NscRB represents the number of sub-carriers in a PRB.

It should be understood that, for operations in the method 300, refer to corresponding operations in the method 200. For simplicity, elaborations are omitted herein.

The method embodiments of the present disclosure are described in detail. The apparatus embodiments of the present disclosure are described in detail below in combination with FIG. 12 to FIG. 15.

Figure 12:
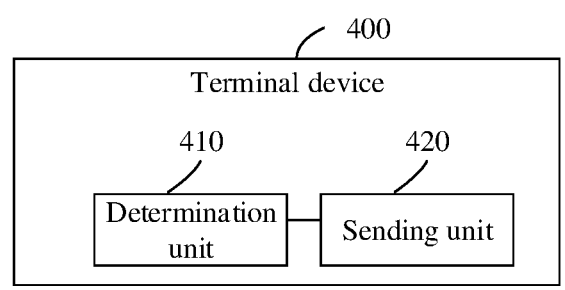
FIG. 12 is a schematic block diagram of a terminal device according to an embodiment of the present disclosure.

FIG. 12 is a schematic block diagram of a terminal device 400 according to an embodiment of the present disclosure.

As illustrated in FIG. 12, the terminal device 400 may include a determination unit and a sending unit.

The determination unit 410 is configured to determine HARQ feedback information corresponding to a first G-RNTI. The first G-RNTI is associated with one or multiple PUCCH resources configured for a first feedback mode, and the first feedback mode includes an HARQ feedback mode only feeding back NACK-included HARQ feedback information.

The sending unit 420 is configured to send, on one of the one or multiple PUCCH resources, the NACK-included HARQ feedback information corresponding to the first G-RNTI. The HARQ feedback information corresponding to the first G-RNTI includes the NACK-included HARQ feedback information corresponding to the first G-RNTI.

In some embodiments of the present disclosure, the first G-RNTI may be associated with a PUCCH resource. The sending unit 420 is configured to send, on the PUCCH resource associated with the first G-RNTI, 1-bit NACK-included HARQ feedback information corresponding to the first G-RNTI.

In some embodiments of the present disclosure, the determination unit 410 is configured determine, within a slot for the one or multiple PUCCH resources, M-bit HARQ feedback information corresponding to the first G-RNTI, wherein M≥1.

In some embodiments of the present disclosure, the first G-RNTI is associated with a PUCCH resource set. The sending unit 420 is configured to determine, based on a bit state of the M-bit HARQ feedback information, the PUCCH resource configured for sending the NACK-included HARQ feedback information corresponding to the first G-RNTI from the PUCCH resource set associated with the first G-RNTI; and send, on the PUCCH resource configured for sending the NACK-included HARQ feedback information corresponding to the first G-RNTI, the NACK-included HARQ feedback information corresponding to the first G-RNTI.

In some embodiments of the present disclosure, the sending unit 420 is configured to, when M is less than or equal to N, determine, based on the bit state of the M-bit HARQ feedback information, the PUCCH resource configured for sending the NACK-included HARQ feedback information corresponding to the first G-RNTI from the PUCCH resource set associated with the first G-RNTI; wherein N=⌊log2(K+1)⌋, ⌊ ⌋ represents rounding down, and K represents the number of PUCCH resources in the PUCCH resource set associated with the first G-RNTI.

In some embodiments of the present disclosure, when M is greater than N, the sending unit 420 is further configured to divide the M-bit HARQ feedback information into S feedback information groups, wherein S is less than or equal to N; convert the HARQ feedback information comprised in each of the S feedback information groups into 1-bit HARQ feedback information for the feedback information group, to obtain HARQ feedback information comprised in the S feedback information groups; determine, based on a bit state of the HARQ feedback information comprised in the S feedback information groups, PUCCH resources configured for sending NACK-included HARQ feedback information comprised in the S feedback information groups from the PUCCH resource set associated with the first G-RNTI; wherein the HARQ feedback information comprised in the S feedback information groups comprises the NACK-included HARQ feedback information comprised in the S feedback information groups; and send, on the PUCCH resources configured for sending the NACK-included HARQ feedback information comprised in the S feedback information groups, the NACK-included HARQ feedback information comprised in the S feedback information groups.

In some embodiments of the present disclosure, different PUCCH resources in the PUCCH resource set associated with the first G-RNTI are configured for sending the HARQ feedback information in different bit states.

In some embodiments of the present disclosure, the terminal device may be configured with one or multiple PUCCH resource sets configured for the first feedback mode; different PUCCH resource sets in the one or multiple PUCCH resource sets correspond to different G-RNTIs; and the one or multiple PUCCH resource sets include the PUCCH resource set associated with the first G-RNTI.

In some embodiments of the present disclosure, initial cyclic shifts of PUCCH format 0, starting symbols of the PUCCH format 0, and starting Physical Resource Blocks (PRBs) of any two PUCCH resources in each of the one or multiple PUCCH resource sets are not all the same.

In some embodiments of the present disclosure, the first G-RNTI may be associated with a PUCCH resource. The sending unit 420 is configured to determine, from the PUCCH resource associated with the first G-RNTI, a PRB and/or a symbol configured for sending NACK-included HARQ feedback information corresponding to the first G-RNTI based on a bit state of the M-bit HARQ feedback information; and send the NACK-included HARQ feedback information corresponding to the first G-RNTI at the PRB and/or the symbol configured for sending the NACK-included HARQ feedback information corresponding to the first G-RNTI.

In some embodiments of the present disclosure, the sending unit 420 is configured to, when M is less than or equal to P, determine, based on the bit state of the M-bit HARQ feedback information, the PRB and/or the symbol configured for sending the NACK-included HARQ feedback information corresponding to the first G-RNTI from the PUCCH resource associated with the first G-RNTI, wherein P represents the number of PRBs in the PUCCH resource associated with the first G-RNTI.

In some embodiments of the present disclosure, when M is greater than P, the sending unit 420 is further configured to: divide the M-bit HARQ feedback information into S feedback information groups, wherein S is less than or equal to P; convert the HARQ feedback information comprised in each of the S feedback information groups into 1-bit HARQ feedback information for the feedback information group, to obtain HARQ feedback information comprised in the S feedback information groups; based on the bit state of the HARQ feedback information comprised in the S feedback information groups, determine, from the PUCCH resource associated with the first G-RNTI, resources or symbols configured for sending NACK-included HARQ feedback information comprised in the S feedback information groups; wherein the HARQ feedback information comprised in the S feedback information groups comprises the NACK-included HARQ feedback information comprised in the S feedback information groups; and send the NACK-included HARQ feedback information comprised in the S feedback information groups at the resources or the symbols configured for sending the NACK-included HARQ feedback information comprised in the S feedback information groups.

In some embodiments of the present disclosure, the PUCCH resource associated with the first G-RNTI may include T*F PRBs, where T≥1 and F≥1; and T represents the number of symbols comprised in the PUCCH resource, and F represents the number of PRBs included in a PUCCH resource frequency domain.

In some embodiments of the present disclosure, F>1, F PRBs are consecutive.

In some embodiments of the present disclosure, different PRBs or different symbols in the PUCCH resources associated with the first G-RNTI are configured for sending the HARQ feedback information in different bit states.

In some embodiments of the present disclosure, the terminal device may be configured with at least one PUCCH resource configured for the first feedback mode; different PUCCH resources among the at least one PUCCH resource correspond to different G-RNTIs; and the at least one PUCCH resource includes the PUCCH resource associated with the first G-RNTI.

In some embodiments of the present disclosure, the at least one PUCCH resource may belong to a same PUCCH resource set.

In some embodiments of the present disclosure, the sending unit 420 is configured to perform an AND operation on the HARQ feedback information in each feedback information group, to obtain the HARQ feedback information for the feedback information group.

In some embodiments of the present disclosure, the sending unit 420 is configured to classify feedback information of all transmission blocks carried in a Physical Downlink Shared Channel (PDSCH) scheduled by a Physical Downlink Control Channel (PDCCH) scrambled by using the first G-RNTI into a feedback information group.

In some embodiments of the present disclosure, the sending unit 420 is further configured to receive resource configuration information. The resource configuration information includes at least one G-RNTI, and information of a resource configured for the first feedback mode and associated with each of the at least one G-RNTI. The at least one G-RNTI includes the first G-RNTI.

In some embodiments of the present disclosure, when the PUCCH resource supports the PUCCH format 0, the resource configuration information may further include a cyclic shift and a starting symbol, which are configured for indicating the PUCCH format 0.

In some embodiments of the present disclosure, the information of the resource configured for the first feedback mode and associated with each G-RNTI may include information used for indicating a starting PRB of the resource.

In some embodiments of the present disclosure, the sending unit 420 is configured to send, within a slot n+k, the NACK-included HARQ feedback information corresponding to the first G-RNTI.

The slot n is a slot where a PDSCH detected by the terminal device and scheduled by the PDCCH scrambled by using the first G-RNTI is located, or is a slot where a PDCCH detected by the terminal device, scrambled by using the first G-RNTI and configured for indicating Semi-Persistent Scheduling (SPS) release is located, where k≥0.

In some embodiments of the present disclosure, a value of k may be indicated by the PDCCH which schedules the PDSCH, or may be indicated by the PDCCH configured for indicating SPS release, or may be configured by high-layer signaling.

In some embodiments of the present disclosure, the slot n may be a slot where a last symbol of the PDSCH detected by the terminal device, scheduled by the PDCCH scrambled by using the first G-RNTI is located, or may be a slot where a last symbol of the PDCCH detected by the terminal device, scrambled by using the first G-RNTI and configured for indicating SPS release is located.

In some embodiments of the present disclosure, the NACK-included HARQ feedback information corresponding to the first G-RNTI may be PUCCH format 0. The sending unit 420 is further configured to determine a cyclic shift $\alpha_l$ of a PUCCH of which a PUCCH format is format 0 based on a following formula:

$$\alpha_l = 2\pi/N_{sc}^{RB}((m_0+n_{cs}(n_{s,f}^{\mu}l+l'))\bmod N_{sc}^{RB})$$

Where, $m_0$ represents an initial cyclic shift used by the PUCCH format 0 indicated in the configuration information of the PUCCH resource configured for the first feedback mode; $n_{cs}(n_{s,f}^{\mu}l+l')$ represents a random number which is determined based on a sending slot and a sending symbol of the PUCCH; l represents an index of a current symbol relative to a starting symbol of the PUCCH; l' represents the starting symbol of the PUCCH; and $N_{sc}^{RB}$ NscRB represents the number of sub-carriers in a PRB.

Figure 13:
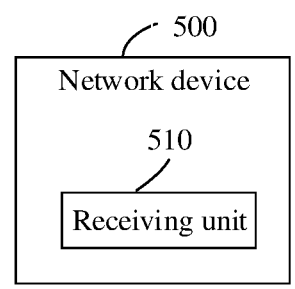
FIG. 13 is a schematic block diagram of a network device according to an embodiment of the present disclosure.

FIG. 13 is a schematic block diagram of a network device 500 according to an embodiment of the present disclosure.

As illustrated in FIG. 13, the network device 500 may include a receiving unit.

The receiving unit 510 is configured to receive, on one or multiple PUCCH resources configured for a first feedback mode and associated with a first G-RNTI, NACK-included HARQ feedback information corresponding to the first G-RNTI. The first feedback mode includes an HARQ feedback mode only feeding back NACK-included HARQ feedback information.

In some embodiments of the present disclosure, the first G-RNTI may be associated with a PUCCH resource. The receiving unit 510 is configured to receive, on the PUCCH resource associated with the first G-RNTI, 1-bit NACK-included HARQ feedback information corresponding to the first G-RNTI.

In some embodiments of the present disclosure, the first G-RNTI may be associated with a PUCCH resource set.

In some embodiments of the present disclosure, different PUCCH resources in the PUCCH resource set associated with the first G-RNTI are configured for sending the HARQ feedback information in different bit states.

In some embodiments of the present disclosure, one or multiple PUCCH resource sets for the first feedback mode may be configured by the network device for a terminal device; different PUCCH resource sets in the one or multiple PUCCH resource sets correspond to different G-RNTIs; and the one or multiple PUCCH resource sets comprise the PUCCH resource set associated with the first G-RNTI.

In some embodiments of the present disclosure, initial cyclic shifts of PUCCH format 0, starting symbols of the PUCCH format 0, and starting Physical Resource Blocks (PRBs) of any two PUCCH resources in each of the one or multiple PUCCH resource sets are not all the same.

In some embodiments of the present disclosure, the first G-RNTI may be associated with a PUCCH resource.

In some embodiments of the present disclosure, the PUCCH resource associated with the first G-RNTI may include T*F PRBs, where T≥1 and F≥1; and T represents the number of symbols comprised in the PUCCH resource, and F represents the number of PRBs included in a PUCCH resource frequency domain.

In some embodiments of the present disclosure, F>1, F PRBs are consecutive.

In some embodiments of the present disclosure, different PRBs or different symbols in the PUCCH resources associated with the first G-RNTI are configured for sending the HARQ feedback information in different bit states.

In some embodiments of the present disclosure, at least one PUCCH resource for the first feedback mode may be configured by the network device for the terminal device; different PUCCH resources among the at least one PUCCH resource correspond to different G-RNTIs. The at least one PUCCH resource includes the PUCCH resource associated with the first G-RNTI.

In some embodiments of the present disclosure, the at least one PUCCH resource may belong to a same PUCCH resource set.

In some embodiments of the present disclosure, the receiving unit 510 may further be configured to send resource configuration information.

The resource configuration information includes at least one G-RNTI, and information of a resource configured for the first feedback mode and associated with each of the at least one G-RNTI; and the at least one G-RNTI includes the first G-RNTI.

In some embodiments of the present disclosure, when the PUCCH resource supports PUCCH format 0, the resource configuration information may further include a cyclic shift and a starting symbol, which are configured for indicating the PUCCH format 0.

In some embodiments of the present disclosure, the information of the resource configured for the first feedback mode and associated with each G-RNTI includes information used for indicating a starting PRB of the resource.

In some embodiments of the present disclosure, the NACK-included HARQ feedback information corresponding to the first G-RNTI may be PUCCH format 0. The receiving unit 510 is further configured to determine, based on a following formula, a cyclic shift $\alpha_l$ of a PUCCH of which PUCCH format is a format 0:

$$\alpha_l = 2\pi/N_{sc}^{RB}((m_0+n_{cs}(n_{s,f}^{\mu}l+l'))\bmod N_{sc}^{RB})$$

Where, $m_0$ represents an initial cyclic shift used by the PUCCH format 0 indicated in the configuration information of the PUCCH resource configured for the first feedback mode; $n_{cs}(n_{s,f}^{\mu}l+l')$ represents a random number which is determined based on a sending slot and a sending symbol of the PUCCH; l represents an index of a current symbol relative to a starting symbol of the PUCCH; l' represents the starting symbol of the PUCCH; and $N_{sc}^{RB}$ NscRB represents the number of sub-carriers in a PRB.

It should be understood that, the apparatus embodiments may mutually correspond to the method embodiments, and have similar descriptions as the method embodiments. Specifically, the terminal device 400 illustrated in FIG. 12 may correspond to the corresponding subject in the method 200 in the embodiments of the present disclosure. The above and other operations and/or functions of each unit in the terminal device 400 are respectively used for implementing corresponding processes in the method 200. Likewise, the network device 500 illustrated in FIG. 13 may correspond to the corresponding subject in the method 300 in the embodiments of the present disclosure. The above and other operations and/or functions of each unit in the network device 500 are respectively used for implementing corresponding processes in each method. For simplicity, details are not described herein again.

The communication device in the embodiments of the present disclosure is described above from the perspective of a functional module with reference to the drawings. It should be understood that, the functional module may be implemented in the form of hardware, or may be implemented through an instruction in the form of software, or may be implemented by a combination of hardware and software modules. Specifically, the operations of the method embodiments in the embodiments of the present disclosure may be completed by an integrated logic circuit of hardware in a processor and/or an instruction in the form of software. In combination with the method disclosed in the embodiments of the present disclosure, the operations may be directly implemented by a hardware processor, or may be performed by a combination of hardware and software modules in the decoding processor. Optionally, the software module may be located in a mature storage medium in the field such as a Random Access Memory (RAM), a flash memory, a Read-Only Memory (ROM), a Programmable ROM (PROM) or Electrically Erasable PROM (EEPROM), and a register. The storage medium is located in a memory, and the processor reads information in the memory, and completes the operations in the method embodiments in combination with hardware.

For example, the determination unit involved above may be implemented by the processor; and the receiving unit and/or the sending unit may be implemented by a transceiver.

Figure 14:
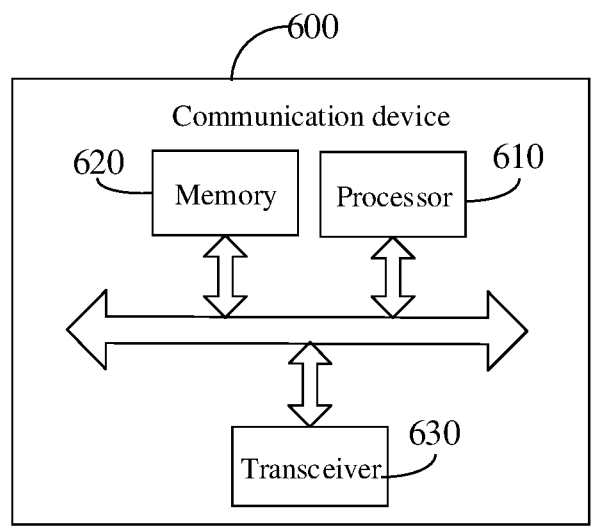
FIG. 14 is a schematic block diagram of a communication device according to an embodiment of the present disclosure.

FIG. 14 is a schematic structural diagram of a communication device 600 according to an embodiment of the present disclosure.

As illustrated in FIG. 14, the communication device 600 may include a processor 610.

The processor 610 may call and run the computer program in the memory to implement the method in the embodiments of the present disclosure.

Continuously referring to FIG. 14, the communication device 600 may further include a memory 620.

The memory 620 may be configured to store indication information, and may further be configured to store a code, an instruction and the like executed by the processor 610. The processor 610 may invoke and run the computer program in the memory 620 to implement the method in the embodiments of the present disclosure. The memory 620 may be an independent device independent of the processor 610 and may also be integrated into the processor 610.

Continuously referring to FIG. 14, the communication device 600 may further include a transceiver 630.

The processor 610 may control the transceiver 630 to communicate with another device, specifically transmitting information or data to another device or receiving information or data transmitted by another device. The transceiver 630 may include a transmitter and a receiver. The transceiver 630 may further include antennae, and there may be one or multiple antennae.

It should be understood that, the assemblies in the communication device 600 are connected to each other by a bus system. The bus system, in addition to including a data bus, further includes a power bus, a control bus and a state signal bus.

It should also be understood that, the communication device 600 may be the terminal device in the embodiments of the present disclosure. The communication device 600 may implement corresponding processes implemented by the terminal device in each method of the embodiments of the present disclosure. That is to say, the communication device 600 in the embodiments of the present disclosure may correspond to the terminal device 400 in the embodiments of the present disclosure, and may correspond to the corresponding subject for executing the method 200 in the embodiments of the present disclosure. For simplicity, details are not described herein again. Similarly, the communication device 600 may be a network device In the embodiment of the present disclosure. The communication device 600 may implement corresponding flows implemented by the network device in each method of the embodiments of the present disclosure. That is to say, the communication device 600 in the embodiments of the present disclosure may correspond to the network device 500 in the embodiments of the present disclosure, and may correspond to the corresponding subject for executing the method 200 in the embodiments of the present disclosure. For simplicity, details are not described herein again.

In addition, an embodiment of the present disclosure further provides a chip.

For example, the chip may be an integrated circuit chip, and has a signal processing capacity. Each method, operation and logical block diagram described in the embodiments of the present disclosure may be implemented or executed. The chip may be called a system-level chip, a system chip, a chip system, or a system on chip. Optionally, the chip may be applied to various communication devices, such that the communication device having the chip mounted can execute each method, operation and logical block diagram disclosed in the embodiments of the present disclosure.

Figure 15:
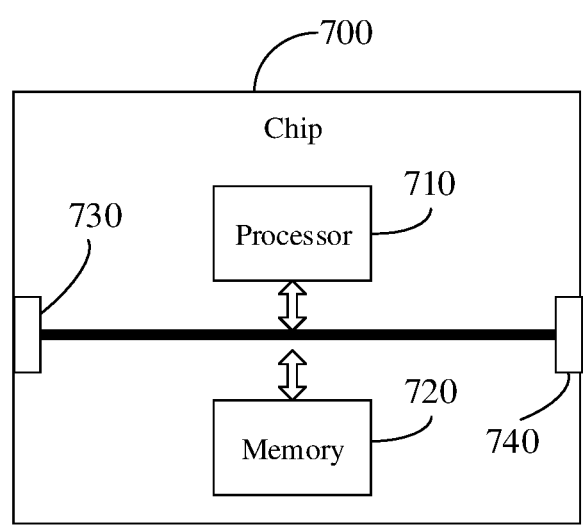
FIG. 15 is a schematic block diagram of a chip according to an embodiment of the present disclosure.

FIG. 15 is a schematic structural diagram of a chip 700 according to an embodiment of the present disclosure.

As illustrated in FIG. 15, the chip 700 may include a processor 710.

The processor 710 may call and run the computer program in the memory to implement the method in the embodiments of the present disclosure.

Continuously referring to FIG. 15, the chip 700 may further include a memory 720.

The processor 710 may invoke and run the computer program in the memory 720 to implement the method in the embodiments of the present disclosure. The memory 720 may be configured to store indication information, and may further be configured to store a code, an instruction and the like executed by the processor 710. The memory 720 may be an independent device independent of the processor 710 and may also be integrated into the processor 710.

Continuously referring to FIG. 15, the chip 700 may further include an input interface 730.

The processor 710 may control the input interface 730 to communicate with another device or chip, specifically acquiring information or data transmitted by another device or chip.

Continuously referring to FIG. 15, the chip 700 may further include an output interface 740.

The processor 710 may control the output interface 740 to communicate with another device or chip, specifically outputting information or data transmitted by another device or chip.

It should be understood that, the chip 700 is applicable to the network device in the embodiments of the present disclosure, and the chip may implement corresponding flows implemented by the network device in each method of the embodiments of the present disclosure, or may implement corresponding processes implemented by the terminal device in each method of the embodiments of the present disclosure. For the sake of brevity, details are not described herein again.

It should also be understood that, the assemblies in the chip 700 are connected to each other by a bus system. The bus system, in addition to including a data bus, further includes a power bus, a control bus and a state signal bus.

The processor mentioned above may include, but is not limited to:

a general processor, a Digital Signal Processor (DSP), an Application Specific Integrated Circuit (ASIC), a Field-Programmable Gate Array (FPGA) or other programmable logic devices, discrete gate or transistor logic devices, and discrete hardware components.

The processor may be configured to implement or execute each method, operation and logical block diagram disclosed in the embodiments of the present disclosure. In combination with the method disclosed in the embodiments of the present disclosure, the operations may be directly implemented by a hardware processor, or may be performed by a combination of hardware and software modules in the decoding processor. The software module may be located in a mature storage medium in the field such as a Random Access Memory (RAM), a flash memory, a Read-Only Memory (ROM), a Programmable ROM (PROM) or Erasable PROM (EPROM), and a register. The storage medium is located in a memory, and the processor reads information in the memory, and completes the operations of the method in combination with hardware.

The memory mentioned above includes, but is not limited to:

a volatile memory or a non-volatile memory. The non-volatile memory may be an ROM, a PROM, an Erasable PROM (EPROM), an EEPROM or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM).

It is to be noted that, the memory described here is intended to include memories of these and any other proper types.

An embodiment of the present disclosure further provides a computer-readable storage medium, configured to store a computer program. The computer-readable storage medium stores one or multiple programs. The one or multiple programs include instructions. The instructions, when being executed by a portable electronic device including a plurality of applications, enable the portable electronic device to execute the method of the method embodiments.

Optionally, the computer-readable storage medium is applicable to a network device in the embodiments of the present disclosure, and the computer program causes a computer to execute corresponding flows implemented by the network device in each method of the embodiments of the present disclosure. For simplicity, elaborations are omitted herein.

Optionally, the computer-readable storage medium is applicable to a mobile terminal/terminal device in the embodiments of the present disclosure, and the computer program causes a computer to execute corresponding flows implemented by the mobile terminal/terminal device in each method of the embodiments of the present disclosure. For simplicity, elaborations are omitted herein.

An embodiment of the present disclosure further provides a computer program product, including a computer program.

Optionally, the computer program product is applicable to a network device in the embodiments of the present disclosure, and the computer program causes a computer to execute corresponding flows implemented by the network device in each method of the embodiments of the present disclosure. For simplicity, elaborations are omitted herein.

Optionally, the computer program product is applicable to a mobile terminal/terminal device in the embodiments of the present disclosure, and the computer program causes a computer to execute corresponding flows implemented by the mobile terminal/terminal device in each method of the embodiments of the present disclosure. For simplicity, elaborations are omitted herein.

An embodiment of the present disclosure further provides a computer program. When the computer program is executed by a computer, the computer may execute the method of the method embodiments.

Optionally, the computer program is applicable to a network device in the embodiments of the present disclosure. When the computer program is run on a computer, the computer executes corresponding flows implemented by the network device in each method of the embodiments of the present disclosure. For simplicity, elaborations are omitted herein.

Optionally, the computer program is applicable to a mobile terminal/terminal device in the embodiments of the present disclosure. When the computer program is run on a computer, the computer executes corresponding flows implemented by the mobile terminal/terminal device in each method of the embodiments of the present disclosure. For simplicity, elaborations are omitted herein.

In addition, the embodiments of the application further provide a communication system, which may include the above terminal device and network device to form a communication system 100 illustrated in FIG. 1. For simplicity, elaborations are omitted herein. It is to be noted that the terms "system" and the like herein may also be referred to as "network management architecture" or "network system" and the like.

It is also to be understood that the terms used in the embodiments and the appended claims of the application are only for describing the specific embodiments and are not intended to limit the embodiments of the application.

For example, singular forms "a/an", "said", "above" and "the" used in the embodiments and appended claims of the application are also intended to include plural forms unless other meanings are clearly expressed in the context.

Those of skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such implementation shall fall within the scope of the embodiments of the present disclosure. If the function is implemented in the form of the software functional unit and sold or used as an independent product, it may be stored in the computer readable storage medium. Based on this understanding, the technical solutions of the embodiments of the present disclosure essentially or the parts that contribute to the prior art, or part of the technical solutions may be embodied in the form of a software product. The computer software product is stored in a storage medium, including a plurality of instructions for causing a computer device (which may be a personal computer, a server, or a network device, and the like) to execute all or part of the operations of the method described in the embodiments of the present disclosure. The foregoing storage medium includes a USB flash disk, a mobile hard disk drive, a Read-Only Memory (ROM), a Random Access Memory (RAM), and various media that may store program codes, such as a magnetic disk or an optical disk.

Those skilled in the art may clearly learn about that specific working processes of the system, device, and units described above may refer to the corresponding processes in the above method embodiments and will not be elaborated herein for ease and briefness of description. In several embodiments provided by the present disclosure, it is to be understood that the disclosed system, apparatus and method may be implemented in other ways. For example, the division of the units or modules or assemblies is merely a logical function division, and there may be other divisions in actual implementation. For example, a plurality of units or modules or assemblies may be combined or integrated into another system, or some units or modules or assemblies may be ignored, or not implemented. For another example, the units/modules/assemblies described as separate/display components may or may not be physically separated, that is, may be located in one place, or may be distributed on the plurality of network units. Part or all of the units/modules/assemblies may be selected according to actual requirements to achieve the purposes of the embodiments of the present disclosure. Finally, it is to be noted that, the displayed or discussed mutual coupling or direct coupling or communication connection may be indirect coupling or communication connection through some interfaces, devices or units, and may be in electrical, mechanical or other forms.

The above are only the specific implementations of the embodiments of the present disclosure and not intended to limit the scope of protection of the embodiments of the present disclosure. Any variations or replacements apparent to those skilled in the art within the technical scope disclosed by the embodiments of the present disclosure shall fall within the scope of protection of the embodiments of the present disclosure. Therefore, the scope of protection of the embodiments of the present disclosure shall be subject to the scope of protection of the claims.

The invention claimed is:

1. A wireless communication method, comprising:
    determining, by a terminal device, Hybrid Automatic Repeat Request (HARQ) feedback information corresponding to a first Group Radio Network Temporary Identifier (G-RNTI); wherein the first G-RNTI is associated with one or multiple Physical Uplink Control Channel (PUCCH) resources configured for a first feedback mode, and the first feedback mode comprises an HARQ feedback mode only feeding back Non-Acknowledgement (NACK)-included HARQ feedback information; and
    sending, by the terminal device, the NACK-included HARQ feedback information corresponding to the first G-RNTI on one of the one or multiple PUCCH resources; wherein the HARQ feedback information corresponding to the first G-RNTI comprises the NACK-included HARQ feedback information corresponding to the first G-RNTI,
    wherein determining, by the terminal device, the HARQ feedback information corresponding to the first G-RNTI comprises:
    determining, by the terminal device within a slot for the one or multiple PUCCH resources, M-bit HARQ feedback information corresponding to the first G-RNTI, wherein $M \geq 1$,
    wherein the first G-RNTI is associated with a PUCCH resource set,
    wherein sending, by the terminal device, the NACK-included HARQ feedback information corresponding to the first G-RNTI on one of the one or multiple PUCCH resources comprises:
        determining, by the terminal device based on a bit state of the M-bit HARQ feedback information, the PUCCH resource configured for sending the NACK-included HARQ feedback information corresponding to the first G-RNTI from the PUCCH resource set associated with the first G-RNTI; and
        sending, by the terminal device, the NACK-included HARQ feedback information corresponding to the first G-RNTI on the PUCCH resource configured for sending the NACK-included HARQ feedback information corresponding to the first G-RNTI.

2. The method of claim 1, wherein determining, by the terminal device based on the bit state of the M-bit HARQ feedback information, the PUCCH resource configured for sending the NACK-included HARQ feedback information corresponding to the first G-RNTI from the PUCCH resource set associated with the first G-RNTI comprises:
    determining, by the terminal device based on the bit state of the M-bit HARQ feedback information, the PUCCH resource configured for sending the NACK-included HARQ feedback information corresponding to the first G-RNTI from the PUCCH resource set associated with the first G-RNTI.

3. The method of claim 2, wherein M is 2,
    performing, by the terminal device, at least one of following operations:
    when the bit state of the 2-bit HARQ feedback information is 00, sending a PUCCH by using a first PUCCH resource in the PUCCH resource set used for the first feedback mode and corresponding to the first G-RNTI; or
    when the bit state of the 2-bit HARQ feedback information is 01, sending a PUCCH by using a second PUCCH resource in the PUCCH resource set used for the first feedback mode and corresponding to the first G-RNTI; or
    when the bit state of the 2-bit HARQ feedback information is 10, sending a PUCCH by using the third PUCCH resource in the PUCCH resource set used for the first feedback mode and corresponding to the first G-RNTI; or
    when the bit state of the 2-bit HARQ feedback information is 11, sending no PUCCH.

4. The method of claim 1, wherein different PUCCH resources in the PUCCH resource set associated with the first G-RNTI are configured for sending the HARQ feedback information in different bit states.

5. The method of claim 4, wherein initial cyclic shifts of PUCCH format 0, starting symbols of the PUCCH format 0, and starting Physical Resource Blocks (PRBs) of any two PUCCH resources in each of the one or multiple PUCCH resource sets are not all the same.

6. The method of claim 1, wherein the NACK-included HARQ feedback information corresponding to the first G-RNTI is PUCCH format 0;
the method further comprises:
determining a cyclic shift $\alpha_l$ of a PUCCH of which a PUCCH format is format 0 based on a following formula:

$$\alpha_l = 2\pi/N_{sc}^{RB}((m_0 + n_{cs}(n_{s,f}^\mu l + l')) \mod N_{sc}^{RB});$$

wherein $m_0$ represents an initial cyclic shift used by the PUCCH format 0 indicated in the configuration information of the PUCCH resource configured for the first feedback mode; $n_{cs}(n_{s,f}^\mu l + l')$ represents a random number which is determined based on a sending slot and a sending symbol of the PUCCH; l represents an index of a current symbol relative to a starting symbol of the PUCCH; l' represents the starting symbol of the PUCCH; and $N_{sc}^{RB}$ NscRB represents the number of sub-carriers in a PRB.

7. A wireless communication method, comprising:
receiving, by a network device, Non-Acknowledgement (NACK)-included Hybrid Automatic Repeat Request (HARQ) feedback information corresponding to a first Group Radio Network Temporary Identifier (G-RNTI) on one or multiple Physical Uplink Control Channel (PUCCH) resources configured for a first feedback mode and associated with the first G-RNTI, wherein the first feedback mode comprises an HARQ feedback mode only feeding back NACK-included HARQ feedback information,
wherein M-bit HARQ feedback information corresponding to the first G-RNTI is determined within a slot for the one or multiple PUCCH resources, wherein M≥1,
wherein the first G-RNTI is associated with a PUCCH resource set,
wherein a PUCCH resource configured for receving the NACK-included HARQ feedback information corresponding to the first G-RNTI is determined from the PUCCH resource set associated with the first G-RNTI based on a bit state of the M-bit HARQ feedback information, and
the NACK-included HARQ feedback information corresponding to the first G-RNTI is received on the PUCCH resource configured for receiving the NACK-included HARQ feedback information corresponding to the first G-RNTI.

8. A terminal device, comprising:
a processor, configured to determine Hybrid Automatic Repeat Request (HARQ) feedback information corresponding to a first Group Radio Network Temporary Identifier (G-RNTI); wherein the first G-RNTI is associated with one or multiple Physical Uplink Control Channel (PUCCH) resources configured for a first feedback mode, and the first feedback mode comprises an HARQ feedback mode only feeding back Non-Acknowledgement (NACK)-included HARQ feedback information; and a transceiver, connected to the processor, and configured to send the NACK-included HARQ feedback information corresponding to the first G-RNTI on one of the one or multiple PUCCH resources; wherein the HARQ feedback information corresponding to the first G-RNTI comprises the NACK-included HARQ feedback information corresponding to the first G-RNTI,
wherein the processor is configured to: determine, within a slot for the one or multiple PUCCH resources, M-bit HARQ feedback information corresponding to the first G-RNTI, wherein M≥1,
wherein the first G-RNTI is associated with a PUCCH resource set;
wherein the transceiver is configured to:
determine, based on a bit state of the M-bit HARQ feedback information, the PUCCH resource configured for sending the NACK-included HARQ feedback information corresponding to the first G-RNTI from the PUCCH resource set associated with the first G-RNTI; and
send, on the PUCCH resource configured for sending the NACK-included HARQ feedback information corresponding to the first G-RNTI, the NACK-included HARQ feedback information corresponding to the first G-RNTI.

9. The terminal device of claim 8, wherein the transceiver is configured to:
when M is less than or equal to N, determine, based on the bit state of the M-bit HARQ feedback information, the PUCCH resource configured for sending the NACK-included HARQ feedback information corresponding to the first G-RNTI from the PUCCH resource set associated with the first G-RNTI; wherein N=⌊log2(K+1)⌋, ⌊ ⌋ represents rounding down, and K represents the number of PUCCH resources in the PUCCH resource set associated with the first G-RNTI.

10. The terminal device of claim 9, wherein M is 2, and the transceiver is configured to perform at least one of following operations:
when the bit state of the 2-bit HARQ feedback information is 00, sending a PUCCH by using a first PUCCH resource in the PUCCH resource set used for the first feedback mode and corresponding to the first G-RNTI; or when the bit state of the 2-bit HARQ feedback information is 01, sending a PUCCH by using a second PUCCH resource in the PUCCH resource set used for the first feedback mode and corresponding to the first G-RNTI; or
when the bit state of the 2-bit HARQ feedback information is 10, sending a PUCCH by using the third PUCCH resource in the PUCCH resource set used for the first feedback mode and corresponding to the first G-RNTI; or
when the bit state of the 2-bit HARQ feedback information is 11, sending no PUCCH.

11. The terminal device of claim 8, wherein different PUCCH resources in the PUCCH resource set associated with the first G-RNTI are configured for sending the HARQ feedback information in different bit states.

12. The terminal device of claim 11, wherein initial cyclic shifts of PUCCH format 0, starting symbols of the PUCCH format 0, and starting Physical Resource Blocks (PRBs) of any two PUCCH resources in each of the one or multiple PUCCH resource sets are not all the same.

13. The terminal device of claim 8, wherein the NACK-included HARQ feedback information corresponding to the first G-RNTI is PUCCH format 0;

the processor is configured to:

determine, based on a following formula, a cyclic shift $\alpha_l$ of a PUCCH of which a PUCCH format is format 0:

$$\alpha_l = 2\pi/N_{sc}^{RB}((m_0 + n_{cs}(n_{s,f}^{\mu}l+l'))\bmod N_{sc}^{RB})$$

wherein $m_0$ represents an initial cyclic shift used by the PUCCH format 0 indicated in the configuration information of the PUCCH resource configured for the first feedback mode; $n_{cs}(n_{s,f}^{\mu}l+l'$ represents a random number which is determined based on a sending slot and a sending symbol of the PUCCH; l represents an index of a current symbol relative to a starting symbol of the PUCCH; l' represents the starting symbol of the PUCCH; and $N_{sc}^{RB}$ NscRB represents the number of sub-carriers in a PRB.

14. A network device, comprising:

a memory, configured to store instructions, a processor, a transceiver, connected to the processor and the memory and configured to receive and transmit information under control of the processor, wherein the processor is configured to run the instructions stored in the memory to implement the operations of the method of claim 7.

\* \* \* \* \*